United States Patent
Nakagawa et al.

(10) Patent No.: US 7,840,334 B2
(45) Date of Patent: Nov. 23, 2010

(54) ENGINE CONTROL SYSTEM

(75) Inventors: Shinji Nakagawa, Hitachinaka (JP);
Kazuhiko Kanetoshi, Yokohama (JP);
Kozo Katogi, Hitachi (JP); Takanobu Ichihara, Naka (JP); Minoru Osuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 508 days.

(21) Appl. No.: 11/846,722

(22) Filed: Aug. 29, 2007

(65) Prior Publication Data
US 2008/0319636 A1    Dec. 25, 2008

(30) Foreign Application Priority Data
Sep. 12, 2006    (JP)    ............... 2006-247113

(51) Int. Cl.
*B60T 7/12* (2006.01)
*G05D 1/00* (2006.01)

(52) U.S. Cl. ...................... 701/103; 701/104

(58) Field of Classification Search ................ 701/103, 701/104, 105, 112, 114; 123/435, 575, 672, 123/679, 693, 694
See application file for complete search history.

(56) References Cited

U.S. PATENT DOCUMENTS

| 4,896,644 | A   | * | 1/1990  | Kato     | 123/492  |
|-----------|-----|---|---------|----------|----------|
| 5,440,922 | A   | * | 8/1995  | Ichikawa | 73/114.04|
| 5,626,122 | A   |   | 5/1997  | Azuma    |          |
| 6,758,201 | B2  | * | 7/2004  | Hosoi    | 123/679  |
| 6,971,368 | B2  | * | 12/2005 | Uchiyama | 123/359  |
| 2005/0103312 | A1 | * | 5/2005 | Uchiyama | 123/457 |

FOREIGN PATENT DOCUMENTS

| JP | 8-261037 A    | 10/1996 |
|----|---------------|---------|
| JP | 09-177579     | 7/1997  |
| JP | 2001-342874 A | 12/2001 |
| JP | 2005-023850   | 1/2005  |
| JP | 2008-144584   | 6/2006  |

OTHER PUBLICATIONS

Chinese Office Action and English Translation thereof.

* cited by examiner

*Primary Examiner*—John T Kwon
(74) *Attorney, Agent, or Firm*—Crowell & Moring LLP

(57) ABSTRACT

An engine control system for an internal combustion engine with a fuel injector, comprises a combustion fuel quantity computing means for computing a combustion fuel quantity in a combustion cycle; and a residual fuel quantity computing means for computing a residual fuel quantity in the combustion cycle based on a difference between an injection fuel quantity of the fuel injector and the combustion fuel quantity.

17 Claims, 23 Drawing Sheets

<BASIC COMBUSTION FUEL QUANTITY
COMPUTING MEANS 120>

<INJECTION FUEL QUANTITY CORRECTION
COEFFICIENT COMPUTING MEANS 130>

⟨RESIDUAL FUEL QUANTITY COMPUTING MEANS 350⟩
EXECUTE IN EACH CYLINDER

<INLET VALVE SURFACE TEMPERATURE ESTIMATING MEANS 355>

EXECUTE IN EACH CYLINDER

ENGINE CONTROL SYSTEM

CLAIM OF PRIORITY

The present application claims priority from Japanese application serial No. 2006-247113, filed on Sep. 12, 2006, the contents of which are hereby incorporated by references into this application.

FIELD OF THE INVENTION

The present invention relates to an engine control system for computing an injection fuel quantity every cycle, particularly, to an engine control system robust and effective in improving air-fuel control accuracy at engine starting.

BACKGROUND ART

Recently, it is required strongly to improve engine exhaust gas emission characteristics in USA, Europe, Japan and the like with tightening of emission control of automobile internal combustion engines. As high performance of a catalyst and high accuracy of a catalyst control are improved, the emission characteristic of the engine exhaust gas discharged at engine starting has become most important. Improvement of air-fuel ratio control accuracy is effective to improve the emission characteristic at engine starting. Deterioration of the emission characteristic is brought due to the following causes. For example, in an inlet port-fuel injection type engine (hereinafter referred to as Multi-Point Injection), a part or almost of fuel injected at engine starting does not flow into a cylinder (combustion chamber) because it adheres to a wall of an intake passage of the engine. Then, as time goes by, since the adhering fuel becomes fuel flow on a wall surface of the intake passage and gradually flows into the combustion chamber and results in degradation of the air-fuel ratio, the deterioration of the exhaust emission characteristic is caused. Incidentally, even in in-cylinders injection type engine, a part or almost of fuel injected at engine starting remains in the cylinder (inner wall surface of the combustion chamber, piston surface or the like) or a crank case. After that, as time goes by, since the remaining fuel burns at next and subsequent times in the combustion chamber, deterioration of the exhaust emission characteristic is caused due to the remaining fuel. Under these circumstances, for example, as shown in Japanese laid-open patent publication No. 2001-34287 and Japanese laid open patent publication No. Hei8-261037, a technique is required to control the combustion air-fuel ratio just after engine starting considering influences of the adhering fuel on the wall flow caused in the intake passage at engine starting.

The engine control system described in the patent document 1, discloses that the quantity of injection fuel is corrected by reducing by a predetermined quantity in the second cycle and subsequent times in accordance with the number of combustion cycles after engine starting. Since this control system corrects an injection fuel quantity by reducing the injection fuel quantity by a regularly predetermined quantity, and accordingly, when the quantity of the adhered fuel flowing on a wall surface of the intake passage etc. in the first cycle changes, the air-fuel ratio control accuracy deteriorates. Accordingly, the exhaust emission characteristic deteriorates. Additionally, when the operation condition of the engine changes, for example, a filling efficiency changes, deterioration of the exhaust emission characteristic is caused as in the case of the above-mentioned adhered fuel flowing on a wall surface at the engine starting. Namely, there is a problem of a low robustness.

In the engine control system disclosed in Japanese laid open patent publication No. Hei 8-261037, the initial value of increment coefficient (increasing coefficient) after the second engine starting is determined based on the adhered fuel after completion of engine starting and the adhered fuel quantity at completion of engine starting is determined based on the start injection fuel quantity and inflow rate of start injection fuel quantity into cylinders (combustion chamber). This control system obtains the quantity of fuel flowing into a cylinder (combustion chamber) from the inflow rate of injection fuel quantity into cylinders at engine starting. Concretely, this engine control system predicts the quantity of fuel flowing into a cylinder by multiplying the quantity of injection fuel at engine starting by a suction coefficient of the combustion chamber. Therefore, it is not based on the actual suction (burning) fuel quantity, and the inflow coefficient accuracy greatly depends on the temperature estimation accuracy of the inlet valve of the engine.

However, keeping the estimation accuracy is a quite difficult from the viewpoint of information of the current sensor (engine cooling water temperature sensor and intake air temperature), because heat conductivity characteristic to the inlet valve is complicated. Furthermore, a variable valve train system will become general use in the future, and thereby, the fuel inflow rate to the combustion chamber can be changed by changing closing and opening timing of the inlet and outlet valves, and by changing lift quantity of the inlet and outlet valves. Therefore, complicated computation needs to estimate these quantities and an error cause may be increase. Further, as the suction coefficient is determined based on a certain fuel property, if the suction fuel quantity is estimated using the suction coefficient when the fuel property changes, an error occurs. As described above, estimation computation is difficult in corresponding various kinds of the condition changes and its low robust is a problem.

SUMMARY OF THE INVENTION

The present invention considers the above circumstance, and its object is to propose an engine control system capable of controlling the combustion air-fuel ratio from just after the engine starting with high accuracy and high robustness.

To accomplish the object of an engine control system of the first practical mode in accordance with the present invention, the system is comprised of: a combustion fuel quantity determining means for directly or indirectly determining a combustion fuel quantity in a combustion cycle; and a residual fuel quantity computing means for computing a residual fuel quantity in the combustion cycle based on a difference between an injection fuel quantity of the fuel injector and the combustion fuel quantity (Refer to FIG. 1).

That is, the residual fuel quantity (unburned fuel) which is not devoted to the combustion in the injection fuel quantity of the current cycle, can be obtained by computing the actual combustion fuel quantity and computing a difference between the actual combustion fuel quantity and the injection fuel quantity.

According to the practical mode, since the residual fuel quantity is not predicted but can be obtained by calculating the fuel quantity flowing (burning) actually into the combustion chamber, there are no problem of the temperature estimation accuracy on the inlet valve and it is also able to correspond to fuel property changes. Therefore, it is capable of suppressing the influence on the residual fuel flowing on the wall in the intake passage and/or cylinder at engine starting with high accuracy and high robustness.

In an engine control system of the second practical mode according to the present invention, the residual fuel quantity computing means defined in the first practical mode computes the residual fuel quantity caused in the current cycle based on the residual fuel quantity in at least the previous cycle (Refer to FIG. 2)

That is, the residual fuel quantity of the current cycle is determined considering the residual fuel quantity at least in the previous cycle.

An engine control system of the third practical mode in accordance with the present invention, in addition to the above-mentioned structure, comprises a computing means for calculating or correcting an injection fuel quantity for the next combustion cycle and subsequent times based on the residual fuel quantity (Refer to FIG. 3).

That is, as described in detail later, since the fuel quantity flowing into the combustion chamber in the next cycle changes in accordance with the residual fuel quantity, the injection fuel quantity of the next cycle is determined (calculated or corrected) in consideration to the change.

In a engine control system in accordance with the fourth practical mode of the present invention, the fuel injector is set so as to face an intake passage or a combustion chamber.

That is, an engine as a target control subject includes clearly both types of so-called an inlet port injection type and in-cylinder injection type.

In the fifth practical mode of an engine control system in accordance with the present invention, the residual fuel quantity computing means computes the quantity of the fuel remaining in at least an intake passage or a cylinder of the engine as the residual fuel quantity.

Specifically, the residual fuel quantity (unburned fuel) remains mainly in the intake passage (wall in the inlet port, inlet valve surface, or the like) for the inlet port injection engine, and in cylinders (inner wall surface of combustion chamber, piston surface and the like) for the in-cylinder injection type engine, respectively.

In the sixth practical mode of an engine control system in accordance with the present invention, the residual fuel quantity computing means computes the residual fuel quantity in a crank case other than an intake passage or a cylinder of the engine As explained in the fifth practical mode, the residual fuel occurs mainly in the intake passage (inner wall surface of the inlet port, inlet valve surface or the like) or in cylinders (inner wall surface of the combustion chamber, piston surface or the like). In a certain case the residual fuel is discharge to the crank case and the like and diffuses into the engine portion of the engine including oil. Accordingly, the place, which generates residual fuel, is not limited to the intake passage and cylinders, but includes other diffusion places.

The $7^{th}$ practical mode of the engine control system in accordance with the present invention, the above-mentioned combustion fuel quantity determining means determines the combustion fuel quantity in a first combustion cycle. The residual fuel quantity computing means computes the residual fuel in the first cycle based on a difference between the injection fuel quantity and the combustion fuel quantity in the first cycle. Further the engine control system comprises an injection fuel quantity computing means for calculating or correcting an injection fuel for the second cycle and subsequent times based on the residual fuel quantity in the first combustion cycle.

(Refer to FIG. 4).

Namely, in the $7^{th}$ practical mode, the first and third practical modes are applied to the first combustion cycle, and the second combustion cycle and subsequent times respectively with more concrete description. The residual fuel quantity in the first combustion cycle is obtained from the difference between the injection fuel quantity of the first combustion cycle and the combustion fuel quantity of the first combustion cycle. As a part of the residual fuel quantity occurred in the first combustion cycle flows into the combustion chamber with delay in the second combustion cycle and subsequent times, the injection fuel quantity for the second cycle and subsequent times is calculated or corrected considering the influence of the residual fuel quantity.

In the $8^{th}$ practical mode of the engine control system in accordance with the present invention, the above-mentioned injection fuel quantity computing means, combustion fuel quantity determining means and residual fuel quantity computing means respectively obtain the injection fuel quantity, the combustion fuel quantity and the residual fuel quantity for each cylinder.

That is, the invention claimed in claims 1 to 7 clearly defines to be practiced in each cylinder separately. However, in the case that the residual fuel quantity has influence on the cylinders and crank case, the injection fuel quantity is distributed or reduced for suppressing and canceling the influence of the residual fuel for each cylinder.

In the $9^{th}$ practical mode of the engine control system in accordance with the present invention, the combustion fuel quantity determining means determines the combustion fuel quantity based on at least one of a combustion pressure in a cylinder of the engine, an air-fuel ratio and a gas temperature in the cylinder sensed directly or indirectly. (Refer to FIG. 5).

Namely, according to the practical mode, it is capable of computing the combustion fuel quantity by sensing directly or indirectly the combustion pressure (a mean effective pressure) in the combustion chamber. Also, by sensing directly or indirectly the air-fuel ratio in the combustion chamber, it is capable of computing the combustion fuel quantity on the basis of air quantity in the combustion chamber (filling efficiency). In addition, by sensing directly or indirectly the in-cylinder gas temperature, it is capable of estimating the in-cylinder pressure or air-fuel ratio, as a result, estimating the combustion fuel quantity becomes possible.

In the 10th practical mode of the engine control system in accordance with the present invention, the combustion fuel quantity determining means determines the combustion fuel quantity based on a sensing signal from at least one of a pressure sensor in a cylinder of the engine, an engine speed sensor and an air-fuel ratio sensor. (Refer to FIG. 6).

That is, the in-cylinder pressure sensor or engine speed sensor is defined as the means for sensing the in-cylinder pressure and the air-fuel sensor is defined as the means for detecting air-fuel ratio.

In the $11^{th}$ practical mode of the engine control system in accordance with the present invention, the combustion fuel quantity determining means computes the combustion fuel quantity based on at least an angular acceleration of the engine speed.

Specifically, as there exists correlation between the angular acceleration of the engine speed (revolution rate) and the in-cylinder pressure, it is capable of obtaining the combustion fuel quantity by computing the angular acceleration through the in-cylinder pressure.

In the 12th practical mode of the engine control system in accordance with the present invention, the combustion fuel quantity determining means determines the combustion fuel quantity based on a sensor signal of at least one of an in-cylinder gas temperature sensor and an exhaust gas temperature sensor.

That is, an in-cylinder gas temperature sensor or exhaust gas temperature sensor are clearly defined as an in-cylinder pressure sensing means.

In the 13$^{th}$ practical mode of the engine control system in accordance with the present invention, the control system is further comprised of: an inflow fuel quantity computing means for computing a fuel quantity portion flowing into a combustion chamber of the engine or burning in the combustion chamber in the next combustion cycle in the residual fuel quantity; and a next cycle-injection fuel quantity computing means for computing the fuel quantity to be injected in the next combustion cycle based on the fuel quantity portion computed by the inflow fuel quantity computing means (Refer to FIG. 7).

That is, a portion of the residual fuel quantity occurred until the previous cycle is flows into the combustion chamber in the next cycle. In consideration of the portion of the residual fuel quantity, the quantity of fuel injected in the next combustion cycle is computed so as to maintain the next cycle combustion fuel quantity at a desired quantity.

In the 14$^{th}$ practical mode of the engine control system in accordance with the present invention, the control system is further comprised of: a next cycle-inflow rate computing means for computing a rate of a fuel quantity portion flowing into a combustion chamber of the engine in the next combustion cycle in the residual fuel quantity remaining in an intake passage of each cylinder; a target next cycle-inflow fuel quantity computing means for computing a target inflow fuel quantity flowing into each cylinder in the next combustion cycle; a target total fuel quantity computing means for computing a target total fuel quantity in the intake passage in the next combustion cycle of each cylinder based on the target next cycle-inflow fuel quantity and the next cycle-inflow rate of each cylinder; and a next cycle-injection fuel quantity computing means for computing the fuel quantity to be injected in the next combustion cycle based on a difference between the target total fuel quantity in the intake passage and the residual fuel for each cylinder (Refer to FIG. 8).

Specifically, the sum of the residual fuel quantity until previous cycle and the injection fuel quantity of next cycle is set as the total fuel quantity in the intake passage. A Rate of fuel flowing into and burning in the combustion chamber in the total fuel quantity, in the intake passage, is shown as the inflow rate. Then the target next cycle inflow (combustion) fuel quantity is firstly determined, and necessary total fuel quantity in the next cycle air intake air is computed based on the next cycle inflow rate. A difference between the total quantity in next combustion cycle in the intake passage and the residual fuel quantity in the previous combustion cycle is set as the next combustion cycle-injection quantity.

In the 15$^{th}$ practical mode of the engine control system in accordance with the present invention, the control system is further comprised of: a sensor means for sensing directly or indirectly the viscosity and/or temperature of the fuel, wherein the above-mentioned next cycle-inflow rate computing means computes the rate of the fuel quantity portion flowing into the combustion chamber in the next combustion cycle based on the viscosity and/or temperature of the fuel (Refer to FIG. 9).

That is, there are mainly two parameters for determining the quantity of fuel flowing into the combustion chamber in the total fuel quantity in intake passage. One parameter is a fuel viscosity. Generally, the total fuel quantity in the intake passage includes a dynamically stable portion (a balance portion) and an instable portion. When the inlet valve opens, the unstable potion of fuel flows into the combustion chamber together with the intake air. Another is the fuel temperature. Vaporizing quantity of fuel changes in the intake passage in accordance with the fuel temperature. The vaporized fuel flows into the combustion chamber together with air intake flow when the inlet valve is opened. As described above, the inflow rate is clearly based on the fuel viscosity and/or fuel temperature.

In the 16$^{th}$ practical mode of the engine control system in accordance with the present invention, the control system is further comprised of: a sensor means for sensing directly or indirectly an inlet valve surface temperature and/or an inner wall surface temperature in the intake passage, wherein the above-mentioned next cycle-inflow rate computing means computes the rate of the fuel quantity portion flowing into the combustion chamber in the next combustion cycle based on the inlet valve surface temperature and/or inner wall surface temperature in the intake passage (Referring to FIG. 10).

Namely, as explained in 14$^{th}$ and 15$^{th}$ practical modes, the inflow rate mainly depends on the fuel viscosity or fuel temperature. As the fuel viscosity changes depending on the fuel temperature, the fuel temperature becomes an important element. Accordingly, as a heat source determining the fuel temperature, temperature of the inlet valve surface and the inner wall surface of the intake passage which contact with the fuel are important elements.

In the 17$^{th}$ practical mode of the engine control system in accordance with the present invention, the above-mentioned next cycle-injection fuel quantity computing means computes the fuel quantity to be injected in the next combustion cycle so as to make air-fuel ratio in the next cycle equal to a predetermined air-fuel ratio.

That is, for example, as exhaust gas emission characteristic such as hydrocarbon concentration is determined mainly by the fuel ratio, the injection fuel quantity is determined so as to maintain the air-fuel ratio at an optimum value.

In the 18$^{th}$ practical mode of the engine control system in accordance with the present invention, the above-mentioned residual fuel quantity computing means treats the residual fuel quantity for each cylinder in the current combustion cycle as a balance quantity of fuel flowing on a wall surface for each cylinder from the current combustion cycle until a predetermined cycle (Refer to FIG. 11).

That is, as described above, generally, the total fuel quantity in the intake passage has dynamically a stable portion (balance portion) and an unstable portion. When the inlet valve is opened, the unstable portion flows into the combustion chamber together with the air intake flow. Therefore, each cylinder-residual fuel quantity occurred in the current cycle as the stable part is defined as balance quantity of fuel flowing on the wall (fluid film quantity).

In the 19$^{th}$ practical mode of the engine control system in accordance with the present invention, in addition to the structure of the 18$^{th}$ piratical mode, the control system is further comprised or: a balance quantity computing means for computing the balance quantity of fuel flowing on a wall surface for each cylinder until the predetermined cycle based on the residual fuel quantity for each cylinder in the first combustion cycle (Refer to FIG. 12).

That is, the treatment in the first cycle is defined clear.

In the 20$^{th}$ practical mode of the engine control system in accordance with the present invention, in addition to the structure of the 19$^{th}$ piratical mode, the control system is further comprised of: a sensor means for sensing directly or indirectly an inlet valve surface temperature and/or an inner wall surface temperature in an intake passage of the engine; and a computing means for computing a reduction value for the balance quantity based on the inlet valve surface temperature and/or inner wall surface temperature in the intake passage; wherein the balance quantity computing means updates the balance quantity of flow flowing on the wall surface for each cylinder until a predetermined cycle, by subtracting the residual fuel quantity for each cylinder in the first combustion cycle by the reduction value for the balance quantity (Refer to FIG. 13).

That is, as described above, the balance quantity (fluid film quantity) of fuel flowing on the wall surface depends on the fuel viscosity and fuel temperature, particularly, the temperature. In addition, as temperature rising, the viscosity reduces and the dynamically stable fuel quantity reduces. Therefore, the system computes a reduction value for the balance quantity based on the inlet valve surface temperature and/or inner wall surface temperature in the intake passage. Then, the system computes the balance quantity of flow flowing on the wall for the second cycle and subsequent times through correcting every cycle the residual fuel quantity (=first cycle-balance quantity) in the first cycle.

In the 21$^{st}$ practical mode of the engine control system in accordance with the present invention, in the structure of the 20$^{th}$ practical mode, the balance quantity computing means updates the balance quantity of flow flowing on the wall surface for each cylinder until a predetermined cycle, by subtracting the residual fuel quantity for each cylinder in the first combustion cycle by the reduction value increased in accordance with the number of the combustion cycles (Refer to FIG. 14).

That is, as explained in the 20 the practical mode, influences of the inlet valve surface temperature and the inlet valve surface temperature in the intake passage determine mainly the balance quantity of fuel flowing on the wall surface. When estimating those surface temperatures, a predetermined estimation algorism thereof is needed. Therefore, as a more simplifying way, the balance quantity for the second cycle and subsequent times is computed by subtracting the residual fuel quantity (=first cycle-balance quantity) in the first cycle by the reduction value increased in accordance with the number of the combustion cycles. This is based on that generally, those surface temperatures increase monotonously depending on the number of cycles after engine stating.

In the 22$^{nd}$ practical mode of the engine control system in accordance with the present invention, the control system is further comprised of: a balance quantity computing means for computing a balance quantity of fuel flowing on a wall in a current combustion cycle; a target air-fuel ratio computing means for computing a target air-fuel ratio for each cylinder in the next combustion cycle; a required combustion fuel quantity computing means for computing a required combustion fuel quantity for each cylinder of the next combustion cycle based on the target fuel quantity and filling coefficient of each cylinder of the next combustion cycle; a balance quantity computing means for computing a balance quantity of fuel flowing on a wall in the next combustion cycle; a fuel injection quantity computing means for computing a fuel injection quantity in the next combustion cycle based on a difference between "the required combustion fuel quantity" and "a difference between the balance quantity in the current combustion cycle and balance quantity in the next combustion cycle.

That is, the system computes the fuel quantity flowing into and burning in the combustion chamber in the next cycle in the total quantity of the inner intake passage from the difference between the current cycle-balance quantity and the next cycle-balance quantity.

Also, the target (required) next cycle-inflow (combustion) fuel quantity is determined based on the target air-fuel ratio and the filling efficiency (air quantity). Then the next cycle-fuel injection quantity is set from the difference between "the required combustion fuel quantity" and "the difference between the current cycle and next-cycle balance quantities".

In the 23$^{rd}$ practical mode of the engine control system in accordance with the present invention under the structure of 16$^{th}$ or 20$^{th}$ practical mode, the means for computing a supplied heat quantity portion for the inlet valve surface temperature and/or an inner wall surface temperature in the intake passage; a means for computing a radiation quantity portion for the inlet valve surface temperature and/or an inner wall surface temperature in the intake passage; a means for computing initial temperature of the inlet valve surface temperature and/or the wall surface temperature in the intake passage; and a means for updating an estimated value of the inlet valve surface temperature and/or wall surface temperature in the intake passage based on the initial temperature, supplied heat quantity portion and radiation heat part (Refer to FIG. 16).

An engine control system according to the 24$^{th}$ practical mode under the structure of 23$^{rd}$ practical mode, wherein the sensor means comprises: a means for computing a basic heat quantity based on the combustion fuel quantity; a means for computing an air-fuel ratio sensitivity correction quantity based on a combustion air-fuel ratio; a means for computing an ignition timing sensitivity correction quantity based on the ignition timing; a means for computing a heat capacity and heat conductivity coefficient; a means for computing a supplied heat quantity portion based on the basic heat quantity, combustion air-fuel sensitivity correction quantity, ignition timing sensitivity correction quantity, heat capacity and heat conductivity coefficient; a means for computing radiation heat; and a means for setting the inlet valve surface temperature and/or the inner wall surface temperature of the intake passage as an initial value.

Specifically, in the 25$^{th}$ practical mode of the engine control system in accordance with the present inventions the system is constituted so as to maintain the combustion air-fuel ratio or exhaust air-fuel ratio until a predetermined cycle from the second cycle within a predetermined range regardless of the injection fuel quantity of each cylinder of the first cycle.

The injection fuel quantity is controlled regardless of combustion fuel quantity or the residual fuel quantity occurred in the first cycle so as to be a desired air-fuel ratio according to the residual fuel quantity occurred in the first cycle. More concretely, the air-fuel ratio after the second cycle air-fuel ratio is smaller than the first cycle injection fuel quantity.

Automobiles in accordance with the present invention, mounts a control system of any one of the first practical modes to the 25$^{th}$.

DETAILED DESCRIPTION OF THE PREFERRED EMBODIMENTS

Hereinafter, an embodiment of the present invention is explained referring to attached drawings.

Figure 1:
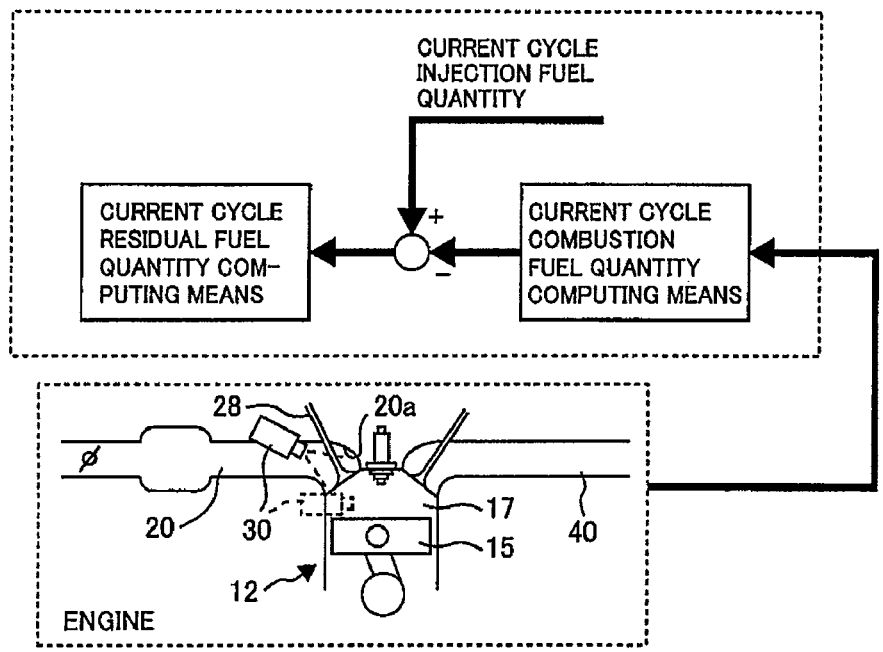
FIG. 1 is a view explaining a control system of the first practical mode in accordance with the present invention.
Figure 2:
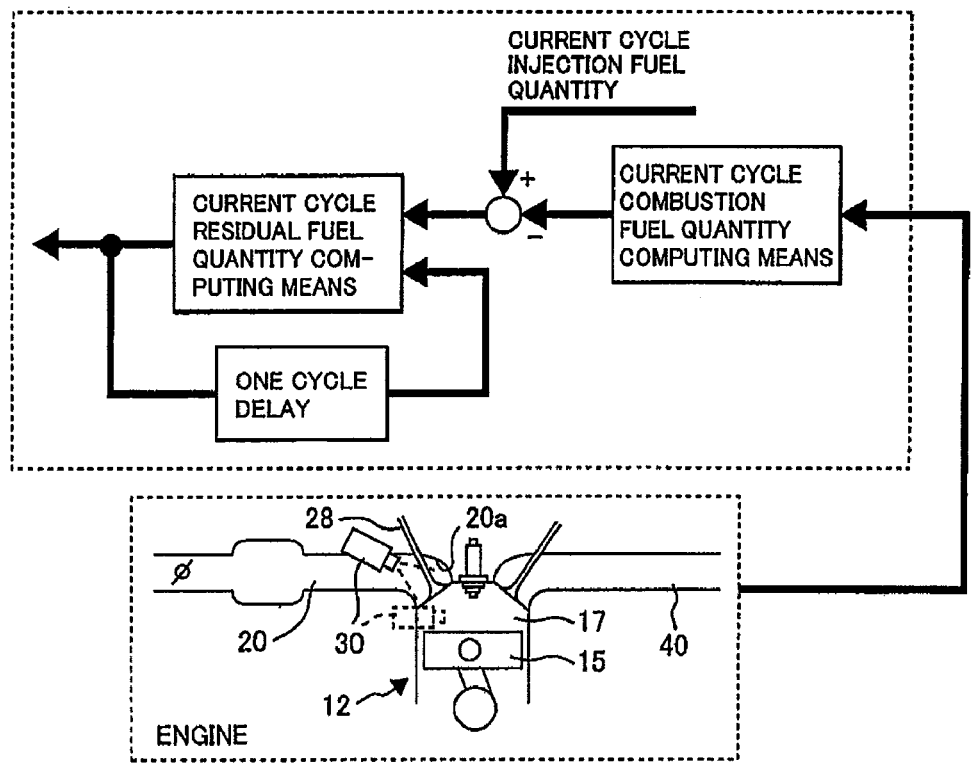
FIG. 2 is a view explaining a control system of the second practical mode in accordance with the present invention.
Figure 3:
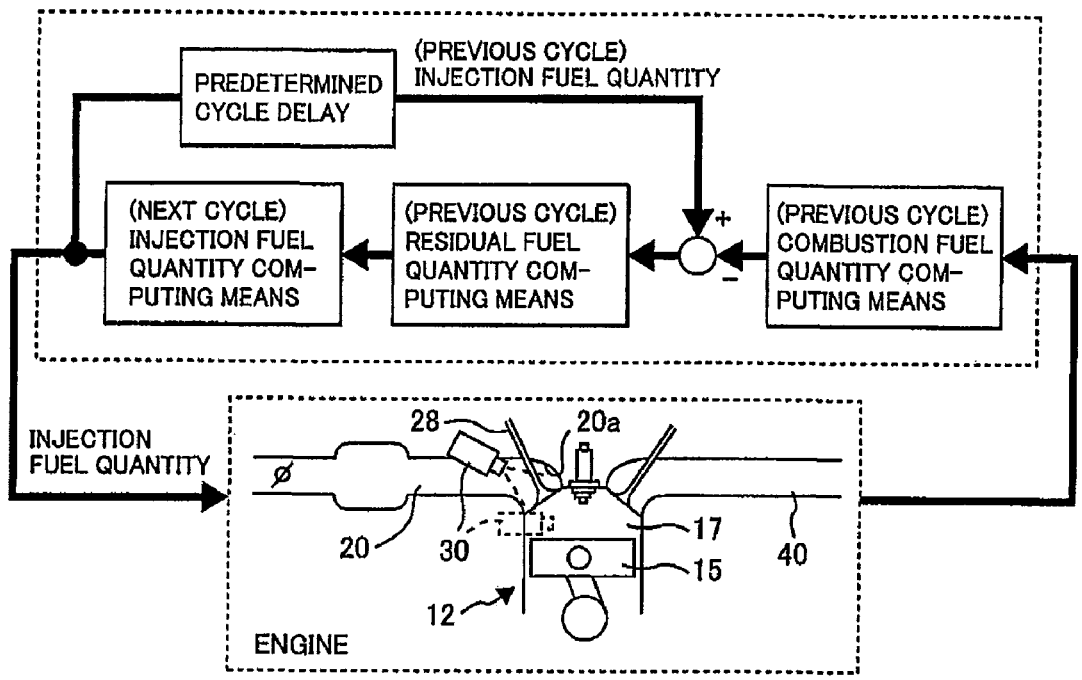
FIG. 3 is a view explaining a control system of the third practical mode in accordance with the present invention.
Figure 4:
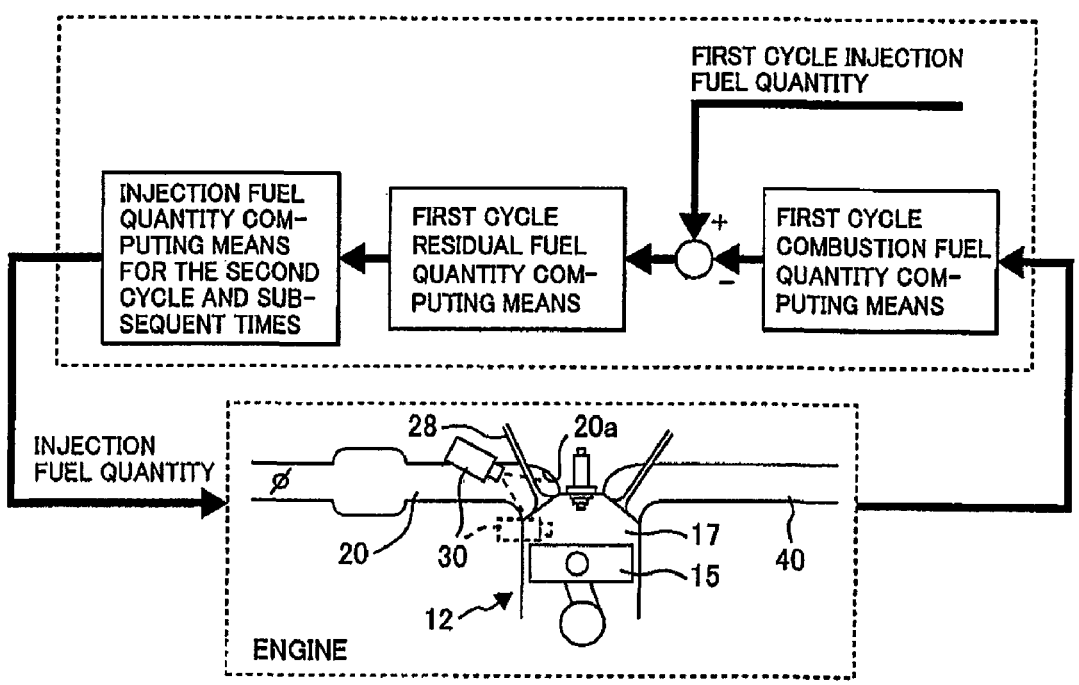
FIG. 4 is a view explaining a control system of the seventh practical mode in accordance with the present invention.
Figure 5:
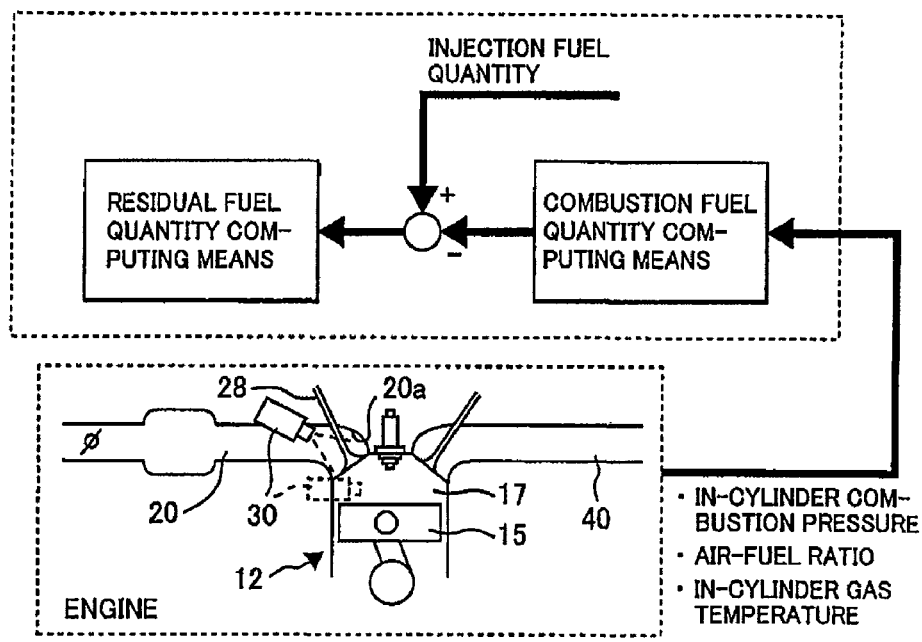
FIG. 5 is a view explaining a control system of the ninth practical mode in accordance with the present invention.
Figure 6:
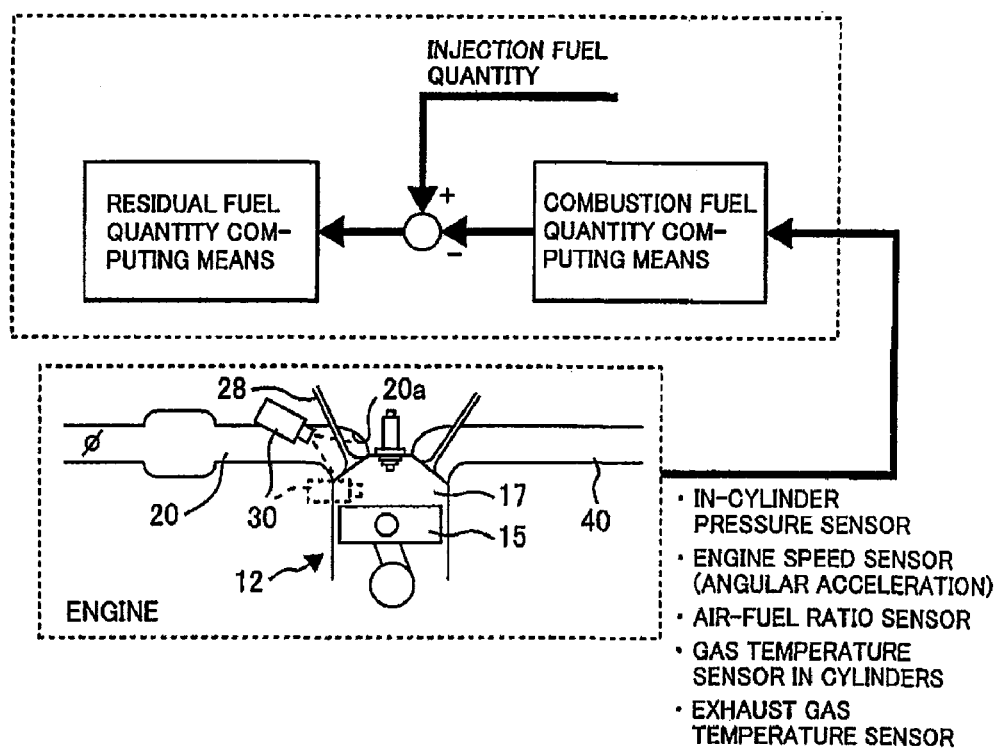
FIG. 6 is a view explaining control systems of the tenth to eleventh practical mode in accordance with the present invention.
Figure 7:
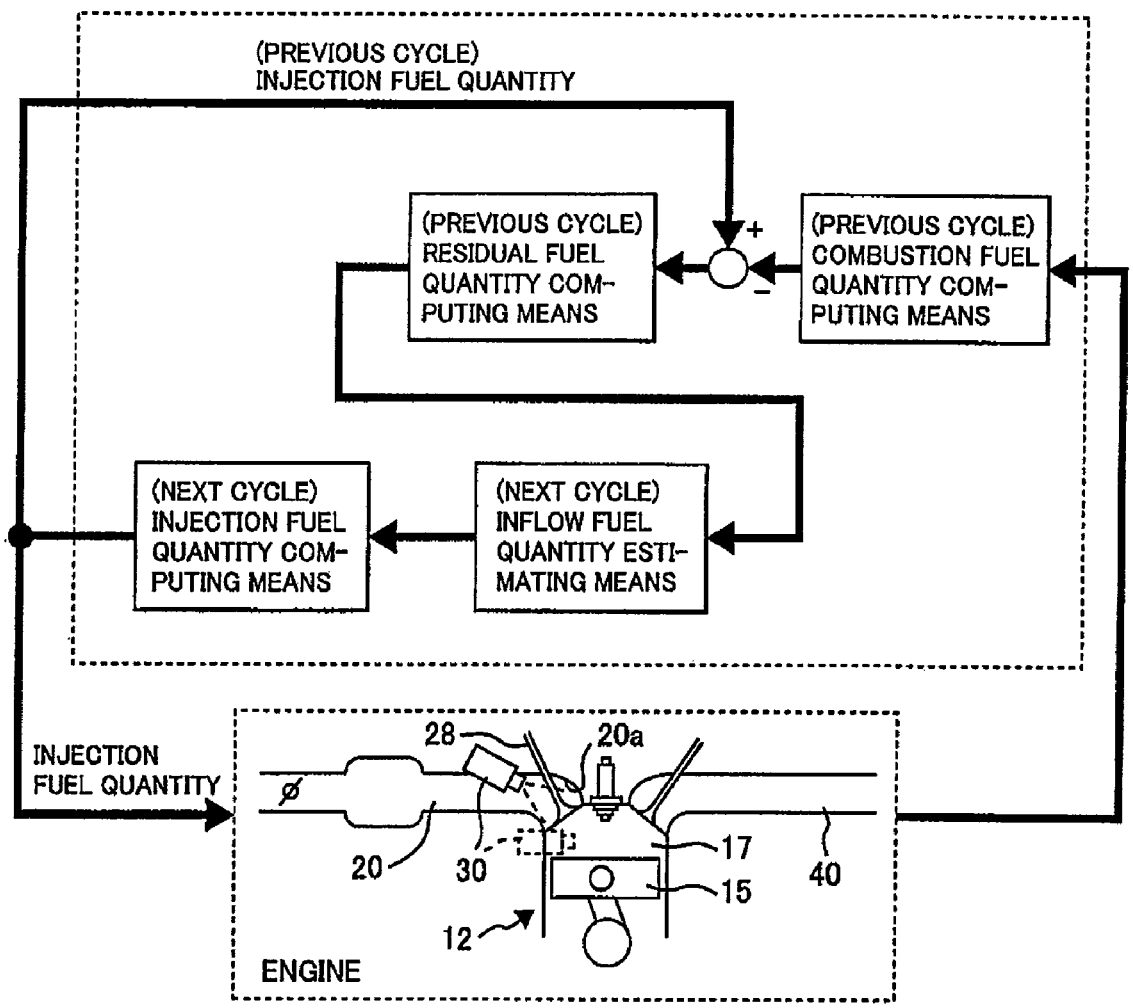
FIG. 7 is a view explaining a control system of the thirteenth practical mode in accordance with the present invention.
Figure 8:
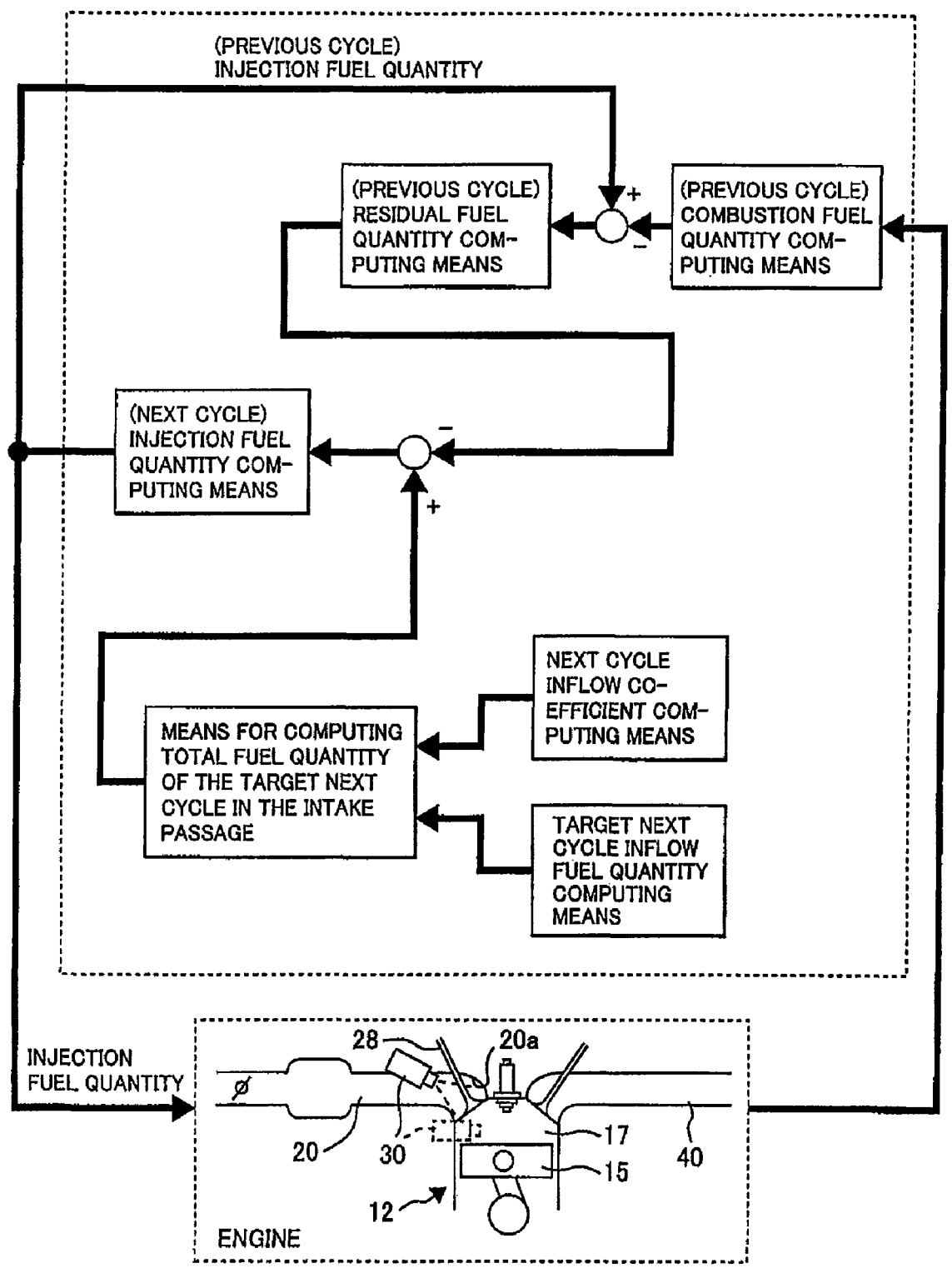
FIG. 8 is a view explaining a control system of the 14th practical mode in accordance with the present invention.
Figure 9:
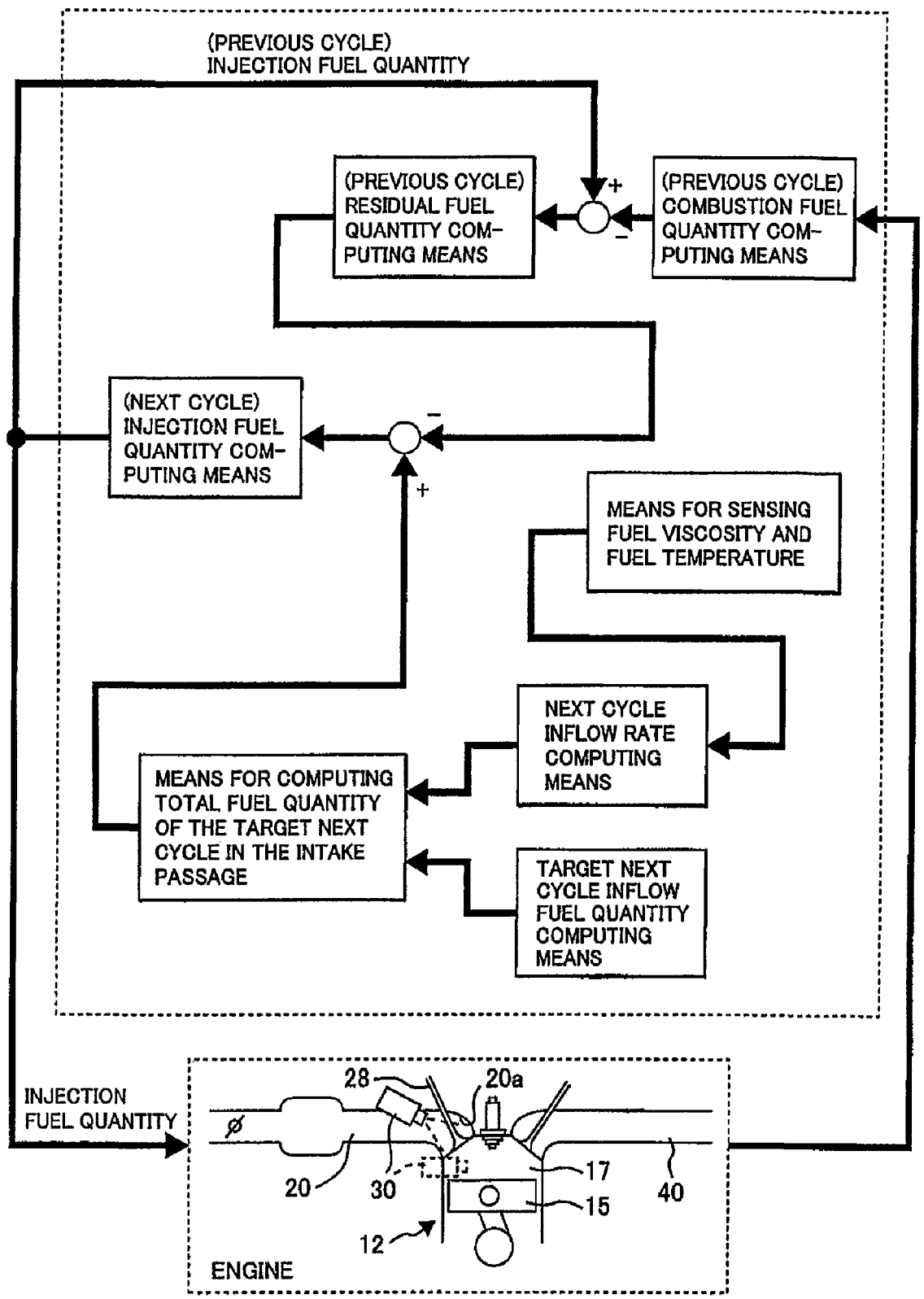
FIG. 9 is a view explaining a control system of the 15th practical mode in accordance with the present invention.
Figure 10:
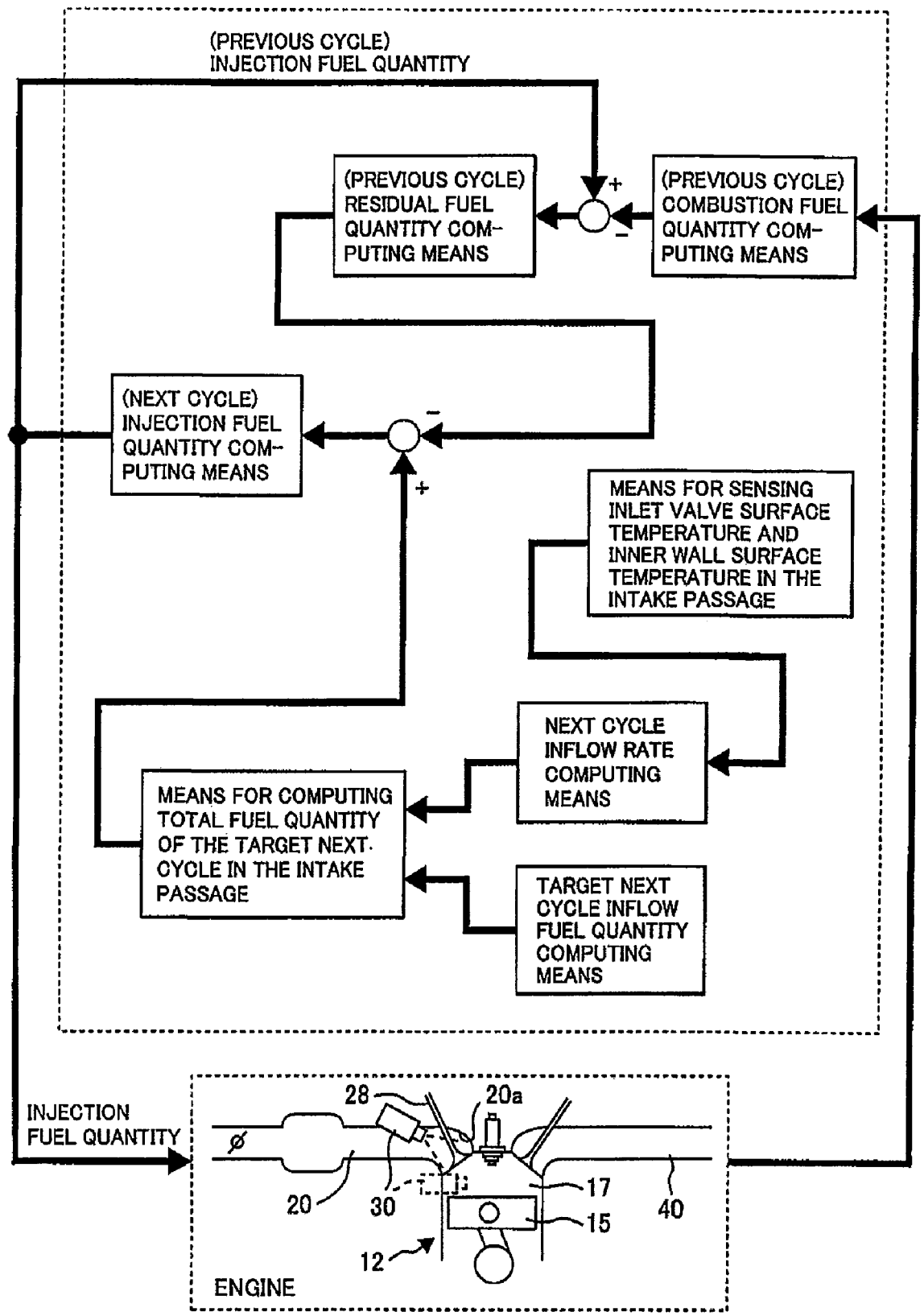
FIG. 10 is a view explaining a control system of the 16th practical mode in accordance with the present invention.
Figure 11:
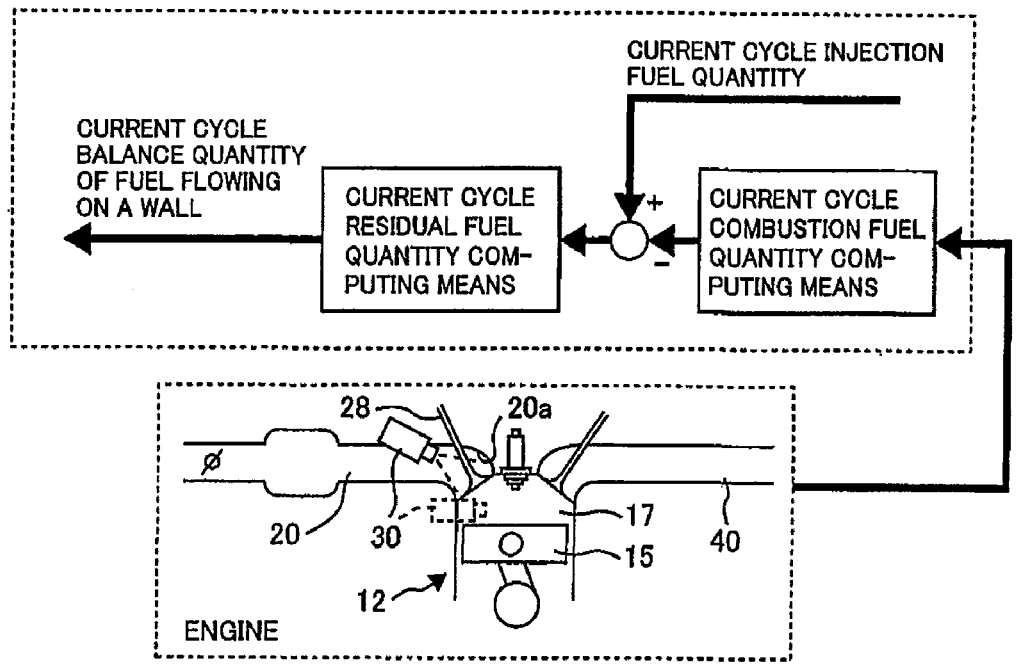
FIG. 11 is a view explaining a control system of the 18th practical mode in accordance with the present invention.
Figure 12:
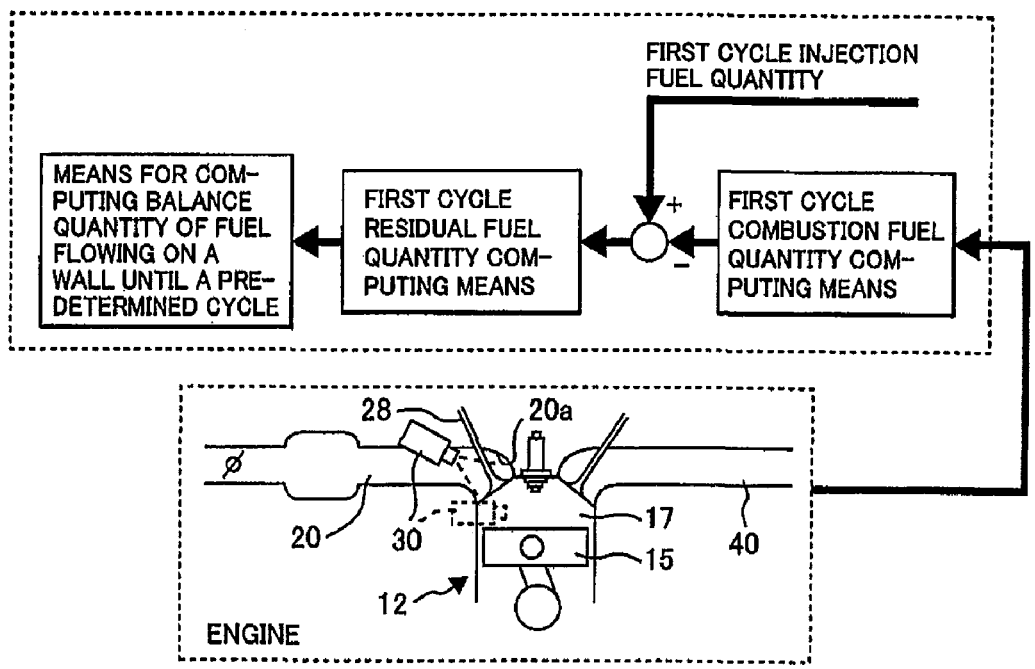
FIG. 12 is a view explaining a control system of the 19th practical mode in accordance with the present invention.
Figure 13:
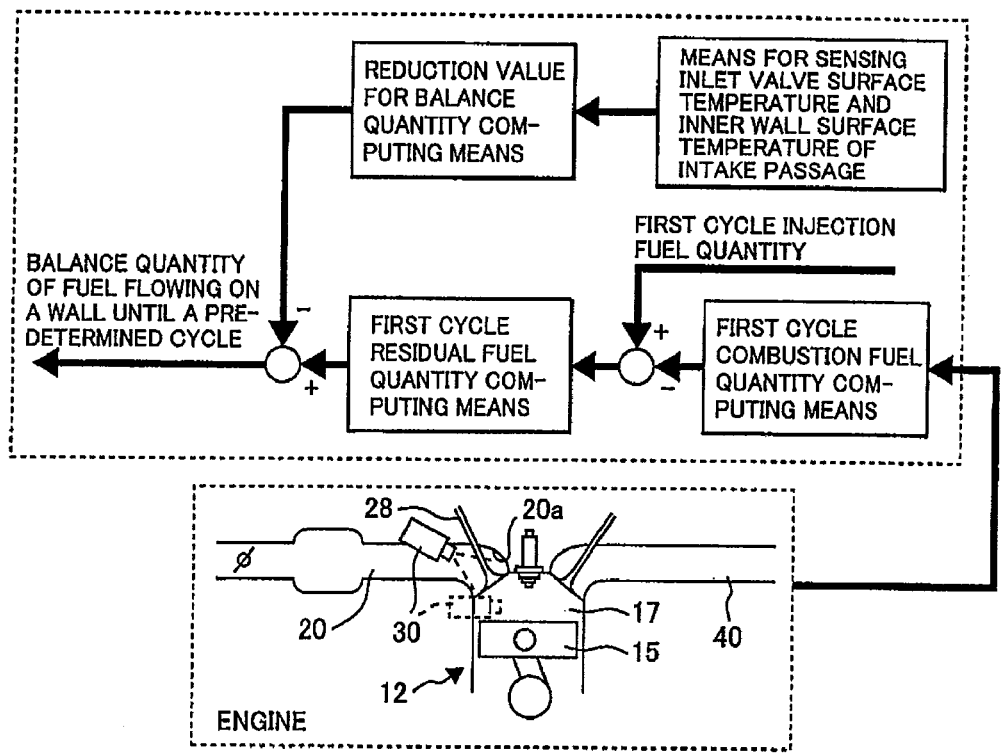
FIG. 13 is a view explaining a control system of the 20th practical mode in accordance with the present invention.
Figure 14:
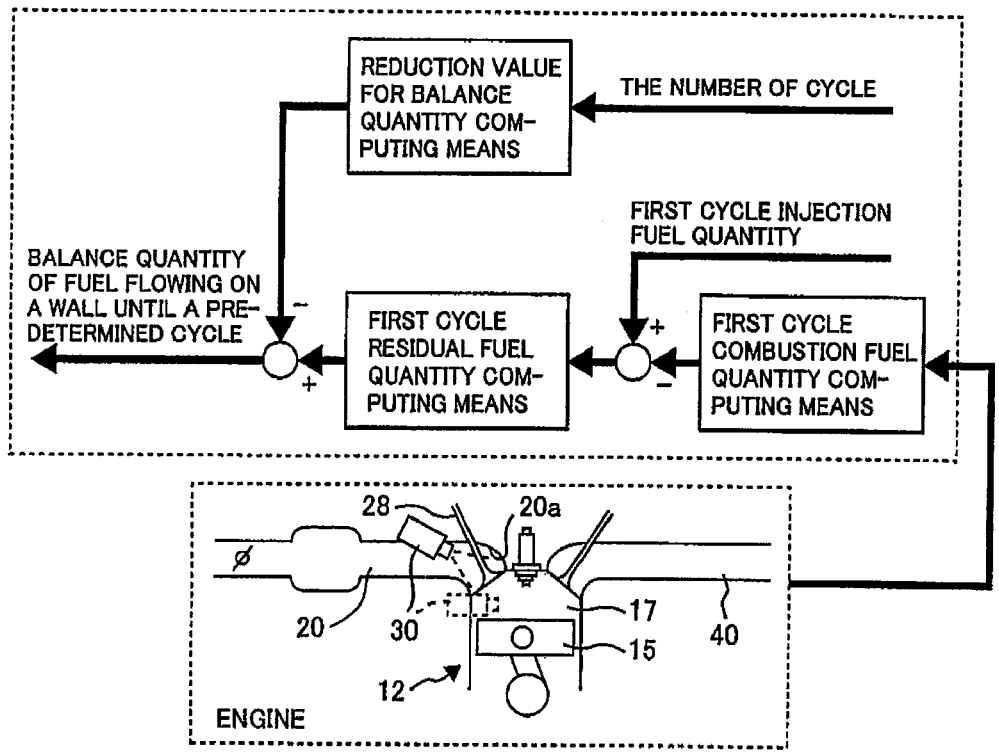
FIG. 14 is a view explaining a control system of the 21st practical mode in accordance with the present invention.
Figure 15:
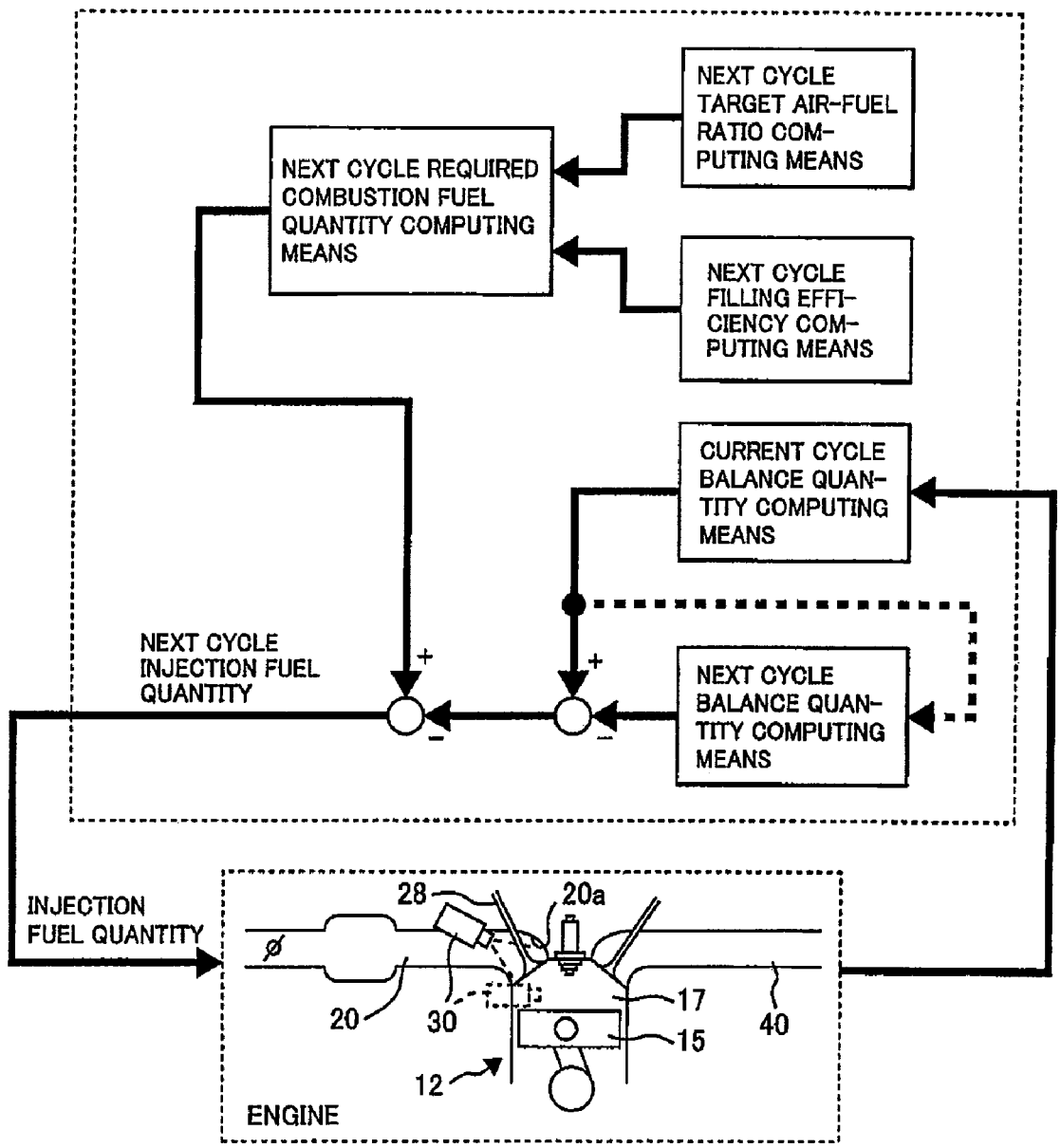
FIG. 15 is a view explaining a control system of the 22nd practical mode in accordance with the present invention.
Figure 16:
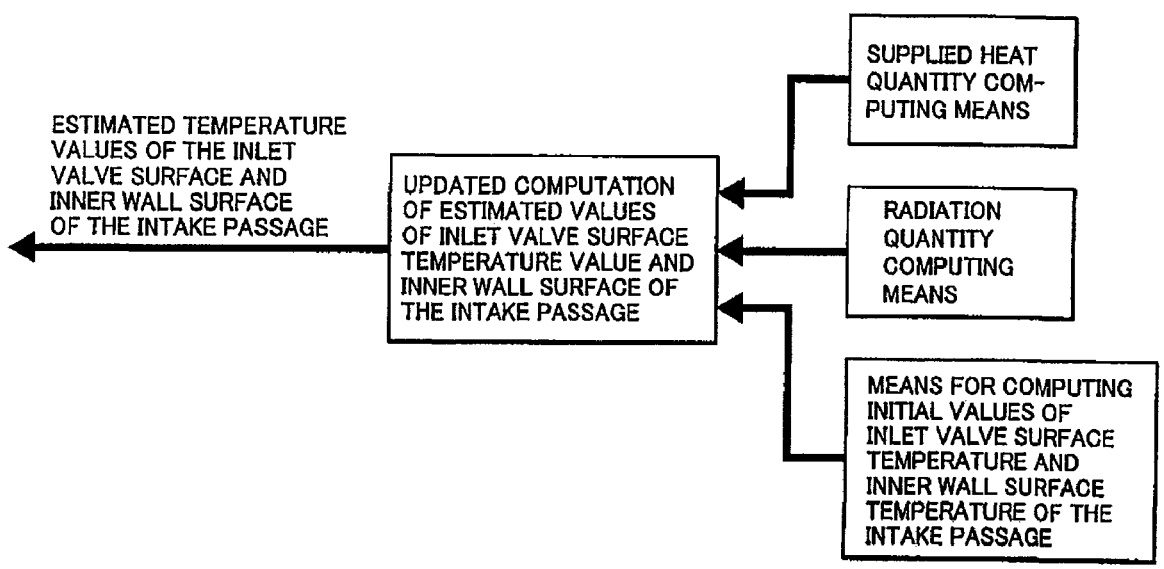
FIG. 16 is a view explaining a control system of the 23rd practical mode in accordance with the present invention.
Figure 17:
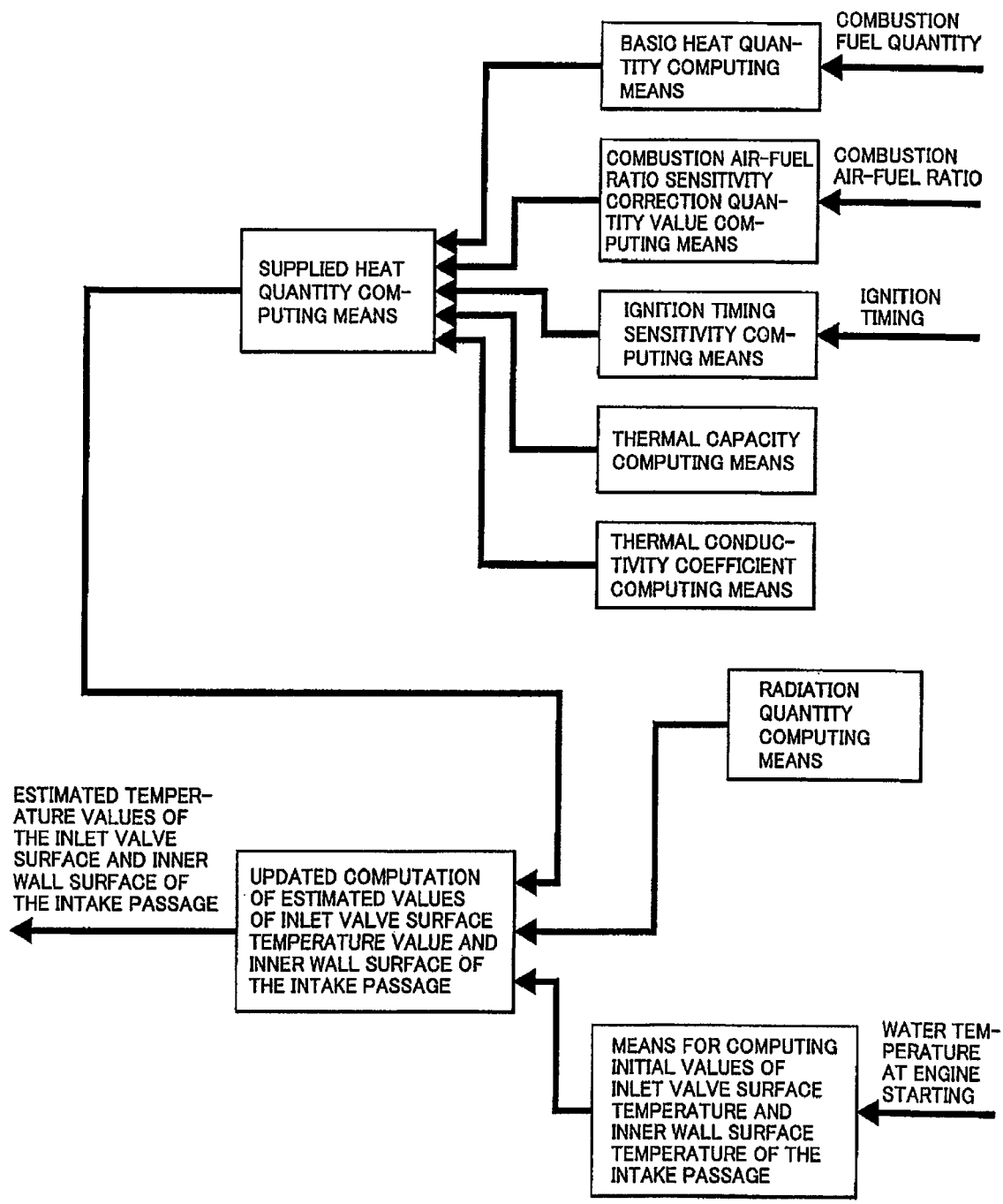
FIG. 17 is a view explaining a control system of the 24th practical mode in accordance with the present invention.
Figure 18:
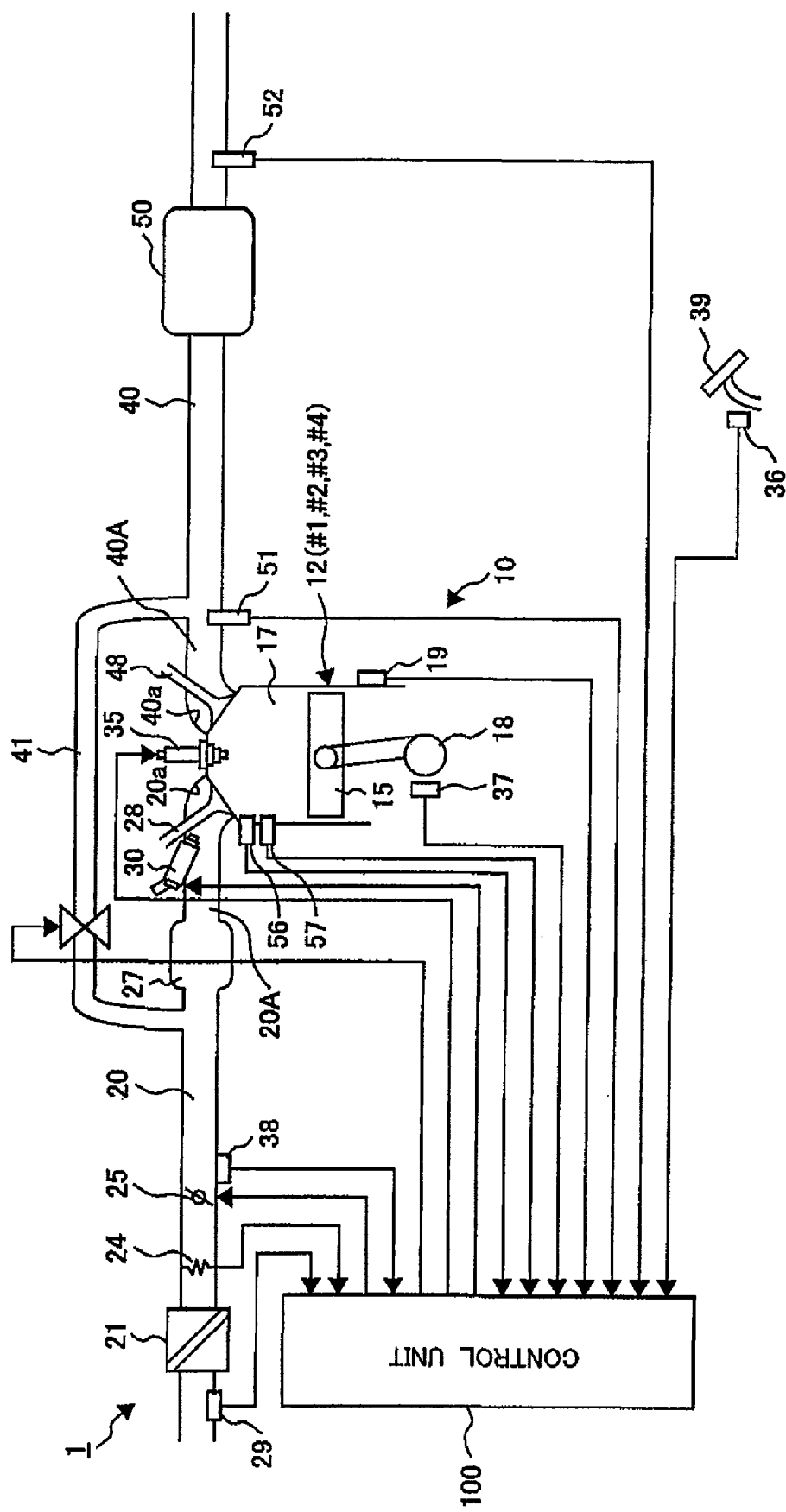
FIG. 18 is a schematic structure view explaining a control system of one embodiment in accordance with the present invention together with an engine using the system.

FIG. 18 is a schematic structure view showing an engine control system of the present embodiment (common to the first to fifth embodiments) in accordance with the present invention together with an example of engines for automobiles where the engine control system is applied.

An engine 10 is a multi-cylinder internal combustion engine having, for example, four-cylinders #1, #2, #3 and #4 as shown with a reference numeral 12 and a piston 15 installed into each cylinder #1, #2, #3, #4. A combustion chamber 17 is formed by an inner wall of the cylinder 12 and a top surface of the piston 15. An ignition plug 35 is disposed so as to face the combustion chamber 17 of each of cylinders #1, #2, #3 and #4.

Air used for combustion of fuel is taken in an intake passage 20 thorough an air cleaner 21, passes through an air flow sensor 24 and an electrical control throttle valve 25, and is led to a collector 27. The air is distributed to an intake manifold passage portion 20A of the intake passage 20 and is taken into the combustion chamber 17 of each cylinder #1, #2, #3, and #4 through an inlet port 20a and an inlet valve 28. A fuel injector 30 for injecting fuel towards the inlet port 20a (inlet valve 28) is provided at each intake manifold passage portion of the intake passage 20. Accordingly, the engine 10 of the present embodiment although adopts an inlet port injection type, the present invention is not limited to these structures and is also applicable to the in-cylinder injection type internal combustion engine.

A mixture of the air taken into the combustion chamber 17 through the intake passage 20 and the fuel injected from the fuel injector 30 is burned by spark ignition of a plug 35. The combustion emission gas (exhaust gas) is discharged to an exhaust manifold portion 40A of the exhaust passage 40 from the combustion chamber 17 through an exhaust port 40 and an outlet valve 48. The exhaust gas passes through the exhaust manifold portion 40A and an exhaust gas collection portion, and flows into a three-way catalyst 50 provided at the downstream portion of the exhaust gas passage and is discharged outside after purification.

An oxygen sensor 52 is disposed downstream of the three-way catalyst in the exhaust passage 40 and an air-fuel sensor 51 as an exhaust gas sensor for sensing the exhaust gas air-fuel ratio is disposed at an exhaust gas collection portion 40B at upstream side of the catalyst 50 in the exhaust passage 40.

The air-fuel ratio sensor 51 has an output characteristic linear to an oxygen concentration included in the exhaust gas. As the relation between the oxygen in the exhaust gas and the air-fuel ratio is linear, it is able to obtain the exhaust air-fuel ratio by the air-fuel ratio sensor 51 outputting the oxygen concentration. The control unit 100 obtains the exhaust gas air-fuel ratio of upstream side of the three-way catalyst based on a signal from the air-fuel ratio sensor 51. The control unit 100 also obtains an oxygen concentration of downstream of the three-way catalyst based on a signal of the oxygen sensor 52 or decides whether the exhaust gas is lich or lean in comparison to a stoichiometric air-fuel ratio based on the signal of the oxygen sensor 52. In addition, the control unit 100 performs an F/B control to correct the fuel injection quantity (the quantity of injected fuel) or an intake air flow rate based on both signals of the sensor 51 and 52 so as to obtain an optimum purification efficiency in the three-way catalyst 50.

A part of the exhaust gas discharged to the exhaust passage 40 from the combustion chamber 17 is taken into the intake passage 20 through an EGR passage 41 and re-circulated to the each combustion chamber 17 of each cylinder #1, #2, #3 and #4, if necessary. The EGR passage 41 is provided with an EGR valve 42 to control the rate of the EGR.

In the control system 1 of the present embodiment, the control unit 100 has a built-in microcomputer to do various control of the engine 10.

Figure 19:
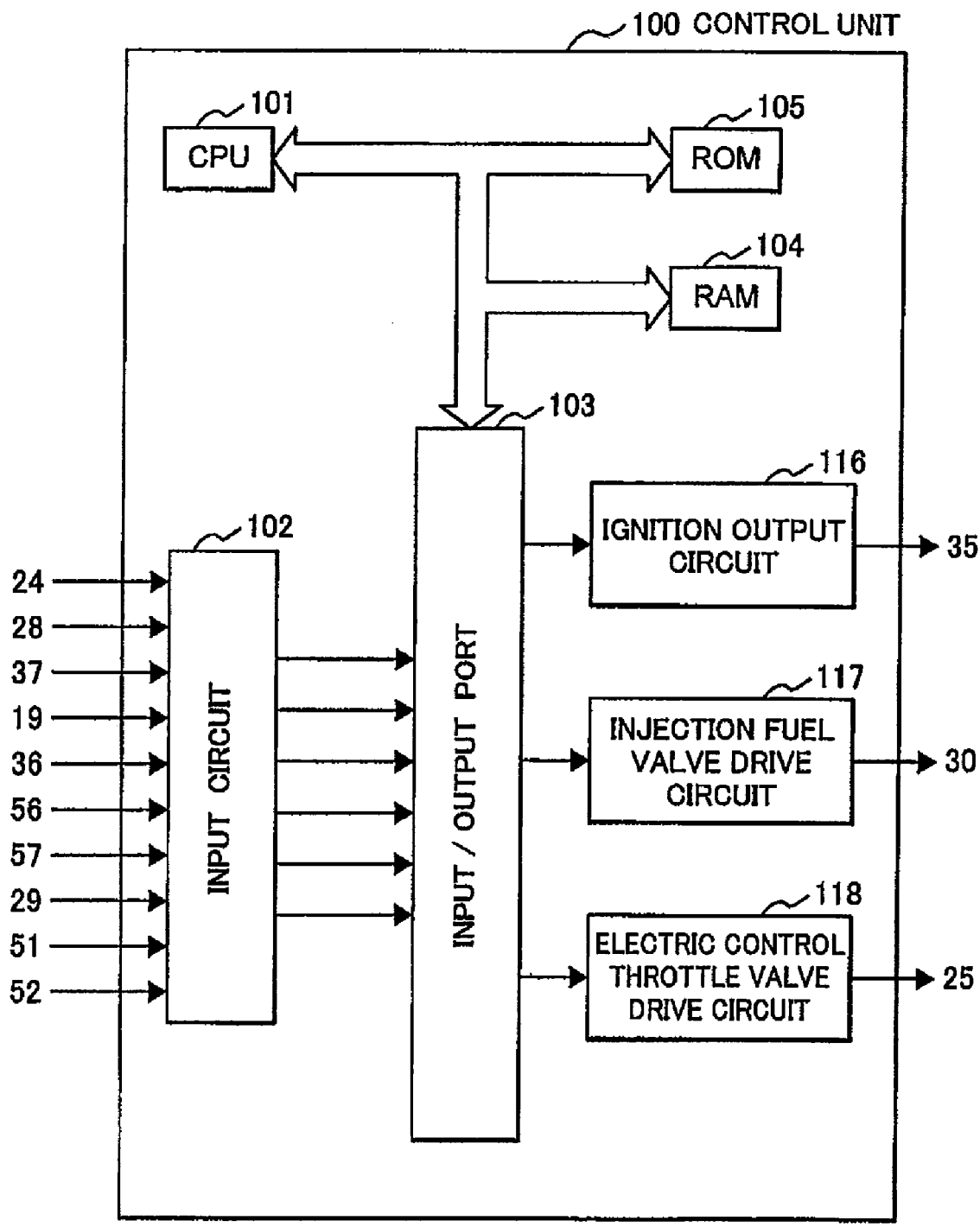
FIG. 19 is a view showing interior structure of the control unit shown in FIG. 18.

As shown in FIG. 19, the control unit 100 has basically a CPU 101, an input circuit 102, an input/output port 103, a ROM 105 and the like.

The control unit 100 receives the following input signal: a signal of the intake air flow rate sensed by the air flow sensor 24, a signal of an opening degree of the throttle valve 25 sensed by the throttle sensor 38, signals indicative of the number of revolutions (engine speed) and a phase of a crank shaft 18 obtained by a crank angle sensor (revolution sensor) 37 in which a pulse signal is outputted every angles of one degree and 120 degree, a signal from the oxygen sensor 52 disposed downstream of the three-way catalyst 50 in the exhaust passage 40 (the signal of the oxygen sensor 52 shows the oxygen concentration at downstream side of the three-way catalyst 50 or shows whether the exhaust gas is rich or lean in comparison to the stoichiometric air-fuel ratio), a signal of the oxygen concentration (air-fuel ratio) sensed by the air-fuel sensor 51 disposed at upstream of the three-way catalyst 50 in the exhaust passage, a signal of an engine-cooling water temperature sensed by an water temperature sensor 19 attached to the cylinder 12, a signal of a depression rate (showing a required torque by a driver) of an accelerator pedal 39 from accelerator sensor 36, a signal of the pressure in each cylinder (in the combustion chamber 17) obtained by an in-cylinder pressure sensor 56 disposed from one cylinder to another, a signal of the temperature in the cylinder (combustion chamber 17) obtained by an in-cylinder temperature sensor 57 disposed in each cylinder, a signal of the intake air temperature (environment temperature) obtained by an intake air temperature sensor 29 disposed near an upstream end of the intake passage 20 and the like as inputs.

The control unit 100 recognizes an engine operation state based on the above-mentioned various kinds of signals (namely, signals from sensors such as the air-fuel ratio sensor 51, oxygen sensor 52, throttle sensor 38, air flow sensor 24, crank angle sensor 37, water temperature sensor 16, accelerator sensor 36, in-cylinder pressure sensor 56, in-cylinder gas temperature sensor 57, intake air temperature sensor 29 and the like), and computes main engine operation quantity such as the intake air quantity, fuel injection quantity (the quantity of the injected fuel) and ignition timing in response to the engine operation state. The fuel injection quantity obtained by the control unit 100 is converted to a valve opening pulse signal for the injector 30 and the converted signal is sent to the injector 30 from fuel injector drive circuit 117. An ignition drive signal is sent to the ignition plug 35 from an ignition output circuit 16 so as to ignite at the ignition timing obtained the control unit 100.

In the control unit 100, the various input signals are sent to an input/output port 103 after processing such as noise removing processing in an input circuit 102. The value of input signal in the input port is stored in a RAM 104 and computing processing is performed in the CPU 101. The control program having the content of the computing processing is written in a ROM 105 beforehand. The value indicative of each operation quantity of each actuator computed according to the control program is stored in a RAM 104 and after that sent to the input/output port 103.

The drive signal for the ignition plug 35 is set at "ON" when passing current through a primary coil in the ignition output circuit 116, and is set at "OFF" when no passing current through the primary coil. The ignition timing is the instant when the drive signal changes from "ON" to "OFF". The "ON" signal for the ignition plug 35 set at the input/output port 103 is amplified to the energy sufficient to ignite by the ignition output circuit 116 and supplied to the ignition plug 35. The drive signal (valve opening pulse signal) of the fuel injector 30 is set at "ON" when the valve of the fuel injector opens, and is set at "OFF" when the valve thereof closes. The "ON" signal for the injector is amplified to sufficient energy to open the fuel injector 30 by the fuel injection drive circuit 117 and sent to the fuel injector 30. The drive signal to realize the target opening degree of the throttle valve 25 is sent to an electric control throttle valve 30 through an electric control throttle valve drive circuit 118.

Next, explained concretely is an embodiment of the control unit 100 executing mainly fuel injection control (control of the quantity of injected fuel).

First Embodiment

FIGS. 20 to 24

Figure 20:
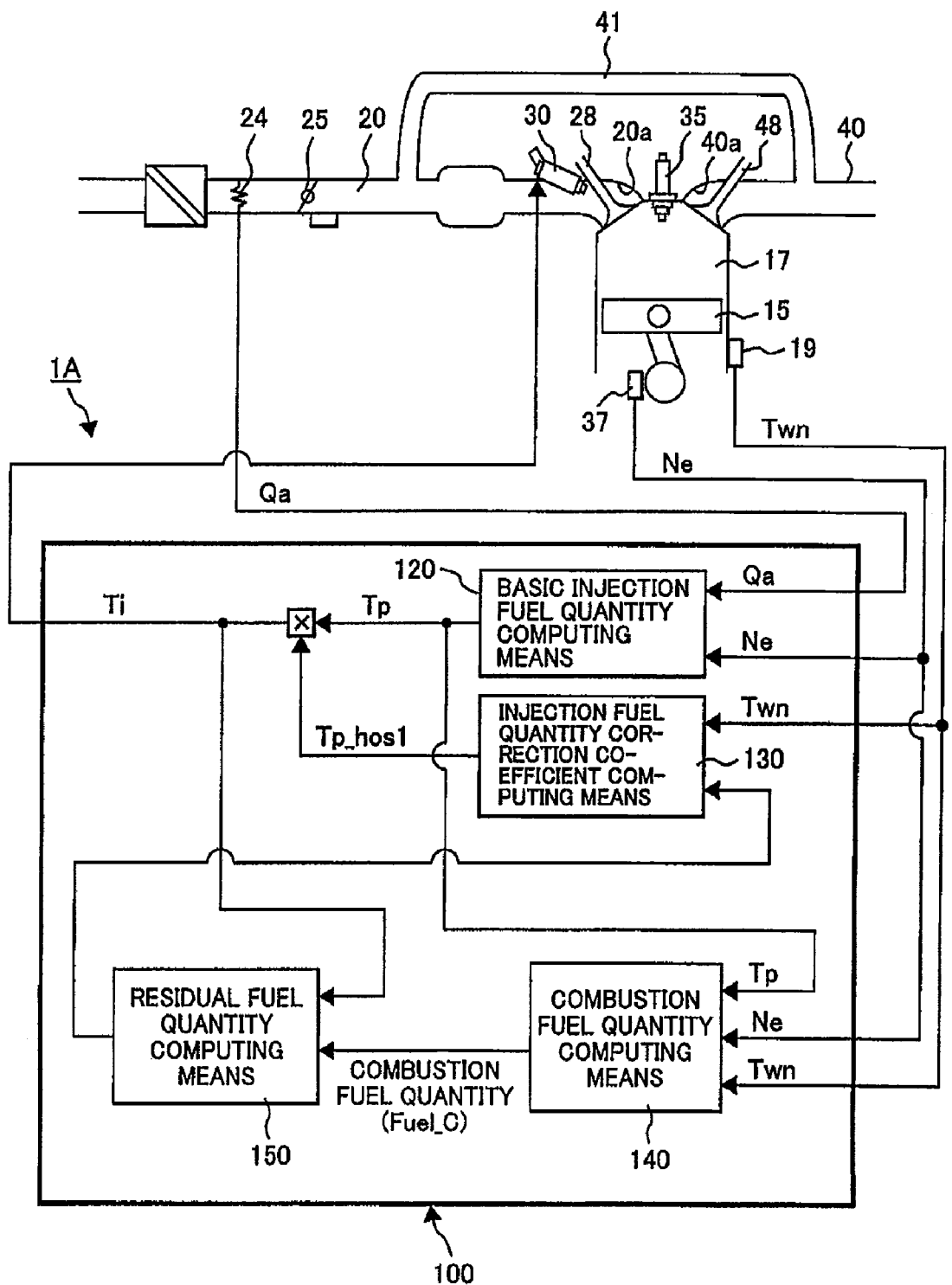
FIG. 20 is a control system view of the first embodiment.

FIG. 20 shows the control system 1A of the first embodiment (the second and third embodiments also are the same as the first embodiment). The control unit 100 of the control system 1A as shown in a function block diagram, comprises a basic injection fuel quantity computing means 120, an injection fuel quantity-correction coefficient computing means 130, a combustion fuel quantity computing means 140 as a combustion fuel quantity determining, and a residual fuel quantity computing means 150. The injection fuel quantity-correction coefficient computing means 130 computes a correction coefficient value Tp_hos1 for each cylinder. The control unit 100 multiplies the basic injection fuel quantity Tp by Tp_hos1 (correction coefficient value), thereby the injection fuel quantity (Ti) for each cylinder is obtained so as to maintain the each cylinder combustion air-fuel ratio at a desired air-fuel ratio. In particular, the value (Tp_hos1) computed by the injection fuel quantity-correction coefficient computing means 130 is computed so as to maintain the combustion air-fuel ratio of the engine starting at a desired air-fuel ratio (near stoichiometric air-fuel ratio). The combustion fuel quantity computing means 140 determines the combustion fuel quantity by sensing and processing the engine speed (angular acceleration). The residual fuel computing means 150 computes the residual fuel quantity based on the combustion fuel quantity and the injection fuel quantity (Ti). Hereinafter, the basic injection fuel quantity computing means 120, the injection fuel quantity-correction coefficient computing means 130, the combustion fuel quantity computing means 140 and the residual fuel quantity computing means 150 are explained in detail.

<Basic Injection Fuel Quantity Computing Means 120 (FIG. 21)>

Figure 21:
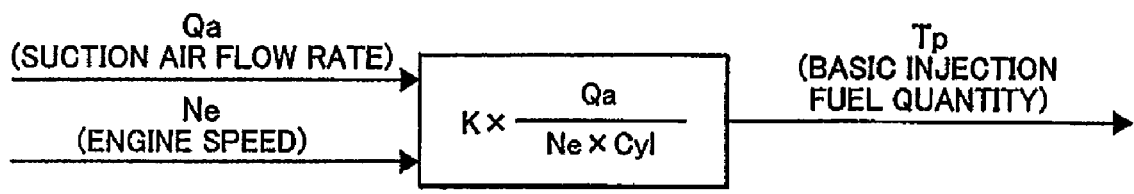
FIG. 21 is a view explaining the basic injection fuel quantity computing means of the first embodiment.

The computing means 120 is to compute the basic injection fuel quantity for realizing simultaneously a target torque and a target air-fuel ratio in any given engine operation condition, based on the engine speed (Ne) and the intake air quantity (Qa). Concretely, the basic injection fuel quantity (Tp) is computed as shown in FIG. 21. In FIG. 21, "Cyl" indicates the number of cylinders. "K" is determined on the specification of the fuel injector 30 (namely a relation between a fuel injection pulse width and the injection fuel quantity). The basic injection fuel quantity (Tp) indicates a fuel quantity corresponding to a stoichiometric air-fuel ratio as well as an intake air quantity (filling efficiency) per one cylinder, too.

<Injection Fuel Quantity-Correction Coefficient Computing Means 130 (FIG. 22)>

Figure 22:
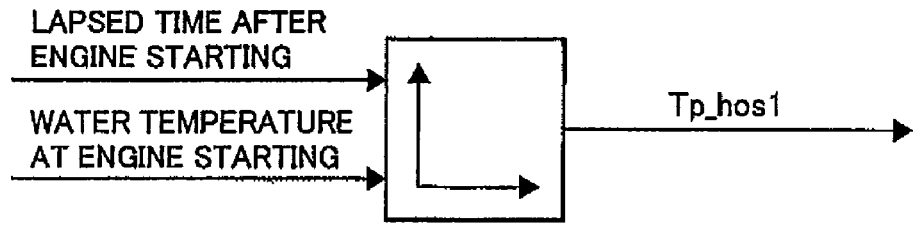
FIG. 22 is a view explaining the combustion fuel quantity correction coefficient computing means of the first embodiment.

The computing means 130 is to compute the injection fuel quantity correction coefficient (Tp_hos1). Particularly, the computation is carried out for combustion air-fuel ratio so as to become a desired air-fuel ratio (near stoichiometric air-fuel ratio)) in the region of low fuel vaporization coefficient at engine starting. Concretely, as shown in FIG. 22, the computation is performed according to the lapsed time after the engine starting and the engine cooling water temperature at engine starting. Since (Tp_hos1) is computed so as to compensate the fuel vaporization coefficient, initial value is determined according to the engine cooling water temperature at engine starting and the value decreases gradually from the initial value according to the lapsed time after engine starting.

Additionally, the correction coefficient computing means 130 corrects the correction coefficient (Tp_hos1) for injection fuel quantity based on the residual fuel quantity of the first cycle (at the time of execution of initial combustion in each cylinder) obtained from the residual fuel quantity computing means 150 described later.

<Combustion Fuel Quantity Computing Means 140 (FIG. 23)>

Figure 23:
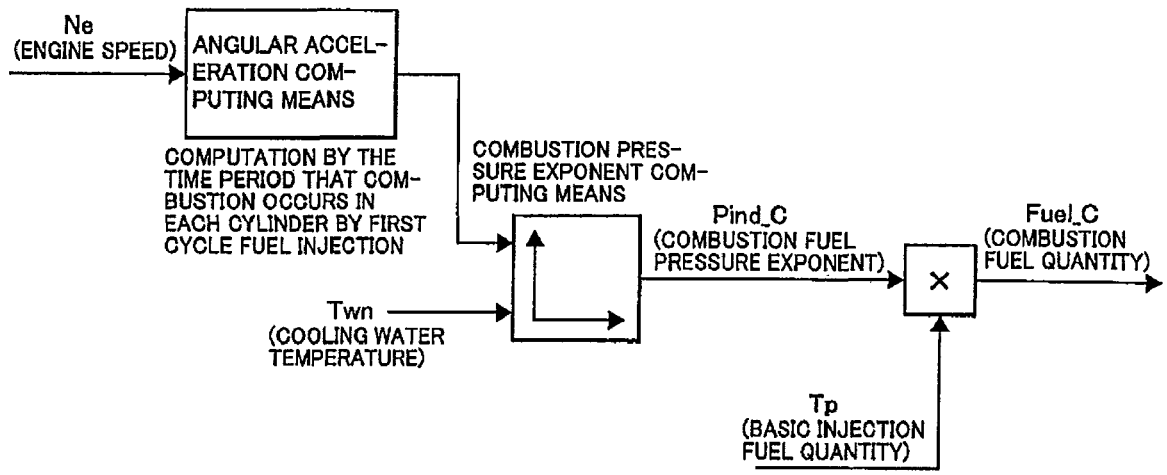
FIG. 23 is a view explaining the combustion fuel quantity detecting means of the first embodiment.

The computing means 140 obtains the combustion fuel quantity (Fuel_C) based on the engine speed (Ne). Computation of the combustion fuel quantity (Fuel_C) by the computing means 140 is carried out only at the first cycle (at the time of initial combustion occurrence of each cylinder). Concretely, as shown in FIG. 23, the angular acceleration is obtained based on the engine speed (Ne). A time period for obtaining the angular acceleration is preferably the time period when the combustion is occurred by the fuel injection of the first cycle. The time period is more appropriate in the vicinity of an expansion stroke. The combustion pressure exponent (P_ind_C) is obtained by referring to a map using the angular acceleration and engine cooling water temperature (Twn) as arguments. Here, referring to the engine cooling water temperature (Twn) is to consider friction loss part. The combustion fuel quantity (Fuel C) is obtained by multiplying the basic injection fuel quantity (Tp) by the combustion pressure exponent (P_ind_C). In addition, the combustion pressure exponent (P_ind_C) may be preferable to obtain through an experiment. While changing the injection fuel quantity (combustion fuel quantity), the angular acceleration is measured at that time, and the combustion pressure exponent (P_ind_C) may be set. It is rather easily set so that the combustion air-fuel ratio is maintained at 1.0 with respect to the stoichiometric air fuel ratio.

<Residual Fuel Quantity Computing Means 150 (FIG. 24)>

Figure 24:
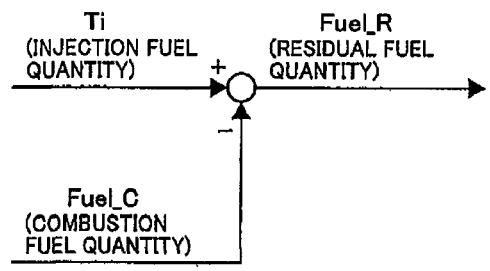
FIG. 24 is a view explaining the residual fuel quantity computing means of the first embodiment.

The computing means 150 is to obtain the residual fuel quantity (Fuel_R). Concretely, as shown in FIG. 24, the residual fuel quantity (Fuel_R) is obtained from a difference between the injection fuel quantity (Ti) and the combustion fuel quantity (Fuel_C). The computation of the residual fuel quantity (Fuel_R) by the computing means 150 is carried out for each cylinder separately. The residual fuel quantity (Fuel_R) of the first cycle obtained, here, is used for the computation of injection fuel quantity correction coefficient (Tp_host1) in the injection fuel quantity-correction coefficient computing means 130.

The residual fuel quantity (Fuel_R) is corresponding to an unburned fuel quantity portion that is not devoted to combustion in the injection fuel quantity (Ti). As described above, in the first embodiment, the residual fuel quantity (Fuel_R) is not obtained by way of prediction, but it is obtained by way of computation of the actual combustion fuel quantity (Fuel_C) and by computing the difference between the actual injection fuel quantity (Ti) and combustion fuel quantity (Fuel_C) in the first cycle. As explained above, fuel quantity actually flowing into the combustion chamber, namely the combustion fuel quantity used for computation of the residual fuel quantity, is obtained regardless of problems of the temperature estimation accuracy of the air inlet valve of the engine, and it is also capable of responding to the change of fuel property. As a result, it is able to suppress influences of the fuel flow on the wall of the intake passage at engine starting, with high accuracy and high robustness.

In the first embodiment (including the second to fifth embodiments described later), the in-cylinder combustion pressure although is obtained from the angular acceleration to use the computation of the combustion fuel quantity, in place of it, as shown in FIG. 18, the in-cylinder combustion pressure may be directly or indirectly obtained by the in-cylinder pressure sensor 56. Also, so long as the air-fuel ratio sensor 51 operates under normal conditions (namely active state), the combustion fuel quantity may be obtained based on the air-fuel ratio and the intake air quantity. In place of them, the combustion fuel quantity may be obtained based on the in-cylinder gas temperature sensed by the in-cylinder gas temperature sensor 57.

The Second Embodiment

Figure 25:
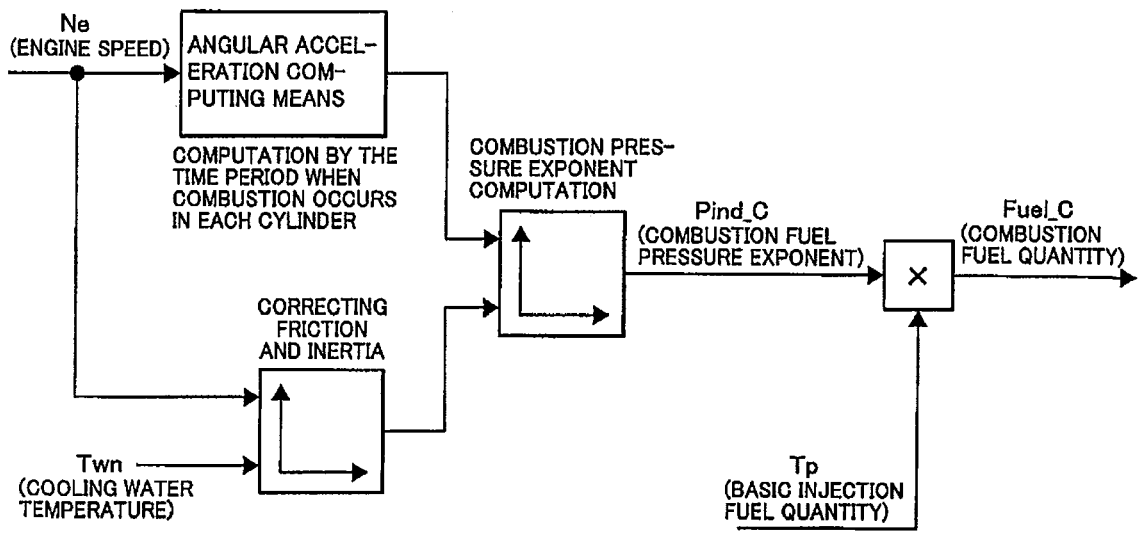
FIG. 25 is a view explaining the combustion fuel quantity computing means of the second embodiment.
Figure 26:
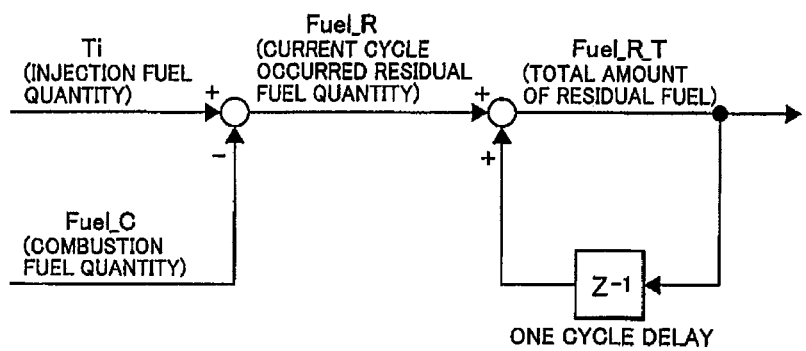
FIG. 26 is a view explaining the residual fuel quantity computing means of the second embodiment.

FIGS. 25 and 26

In the first embodiment shown as above, the residual fuel quantity (Fuel_R) only in the first cycle is obtained, however, in the second embodiment, the residual fuel quantity in the second and subsequent times is obtained.

The second embodiment differs from the first embodiment in only structures and functions of the combustion fuel computing means (which is denoted by reference numeral 140 in the first embodiment and by reference numeral 240 in the second embodiment) and the residual fuel quantity computing means (which is denoted by reference numeral 150 in the first embodiment and by reference numeral 250 in the second embodiment), and both are the same except for that. Therefore, hereinafter, mainly explained are the combustion fuel quantity computing means 240 and the residual fuel quantity computing means 250.

<Combustion Fuel Quantity Computing Means 240 (FIG. 25)>

The computing means 240 obtains the combustion fuel quantity (Fuel_C) based on the engine speed (Ne). The computation of the combustion fuel quantity (Fuel_C) by the computing means 240 is carried out at the time of combustion occurrence in each cylinder (every combustion cycle). Concretely, as shown in FIG. 25, the angular acceleration is obtained based on the engine speed (Ne). A time period for obtaining the angular acceleration is preferable the time period when the combustion occurs. The time period is more appropriate in the vicinity of an expansion stroke. A friction/inertia coefficient is obtained by referring to a map using the engine speed (Ne) and the engine cooling water temperature (Twn) as arguments. Here, referring to the engine cooling water temperature (Twn) is for considering friction loss part. Referring to the engine speed (Ne) is to consider the inertia part.

A combustion pressure exponent (P_ind_C) is obtained by referring to a map using the angular acceleration and friction/inertia correction coefficients as arguments. The combustion fuel quantity (Fuel C) is obtained by multiplying the basic injection fuel quantity (Tp) by the combustion pressure exponent (P_ind_C). In addition, the combustion pressure exponent (P_ind_C) may be preferably obtained from an experiment. While changing the injection fuel quantity (combustion fuel quantity), the angular acceleration is measured at that time, and the combustion pressure exponent (P_ind_C) may be set. It is rather easily set so that the combustion air-fuel ratio is maintained at 1.0 with respect to the stoichiometric air fuel ratio.

<Residual Fuel Quantity Computing Means 250 (FIG. 26)>

The computing means 250 obtains the residual fuel quantity (Fuel_R) at the combustion occurrence in each cylinder (every combustion cycle), respectively. Concretely, as shown in FIG. 26, the residual fuel quantity (Fuel_R) in a current cycle (combustion cycle) is obtained from a difference between the injection fuel quantity (Ti) and the combustion fuel quantity (Fuel_C). By integrating the resulting residual fuel quantities (Fuel_R), total residual fuel quantity is obtained.

In the second embodiment, the injection fuel quantity in next cycle (combustion cycle) is determined in consideration of changing the quantity of fuel flowing into the combustion chamber 17 in accordance with the residual fuel quantity at the current moment. That is, the residual fuel quantity (Fuel_R) in the current cycle is obtained from the difference between the injection fuel quantity (Ti) and the combustion fuel quantity (Fuel_C) every cycle; the total residual fuel quantity (Fuel_R) is obtained by integrating them; and the next cycle-injection fuel quantity (Ti) is set by using this total residual fuel quantity (Fuel_R_T). As a result of this, the injection fuel quantity (Ti) becomes more appropriate.

Third Embodiment

Figure 27A:
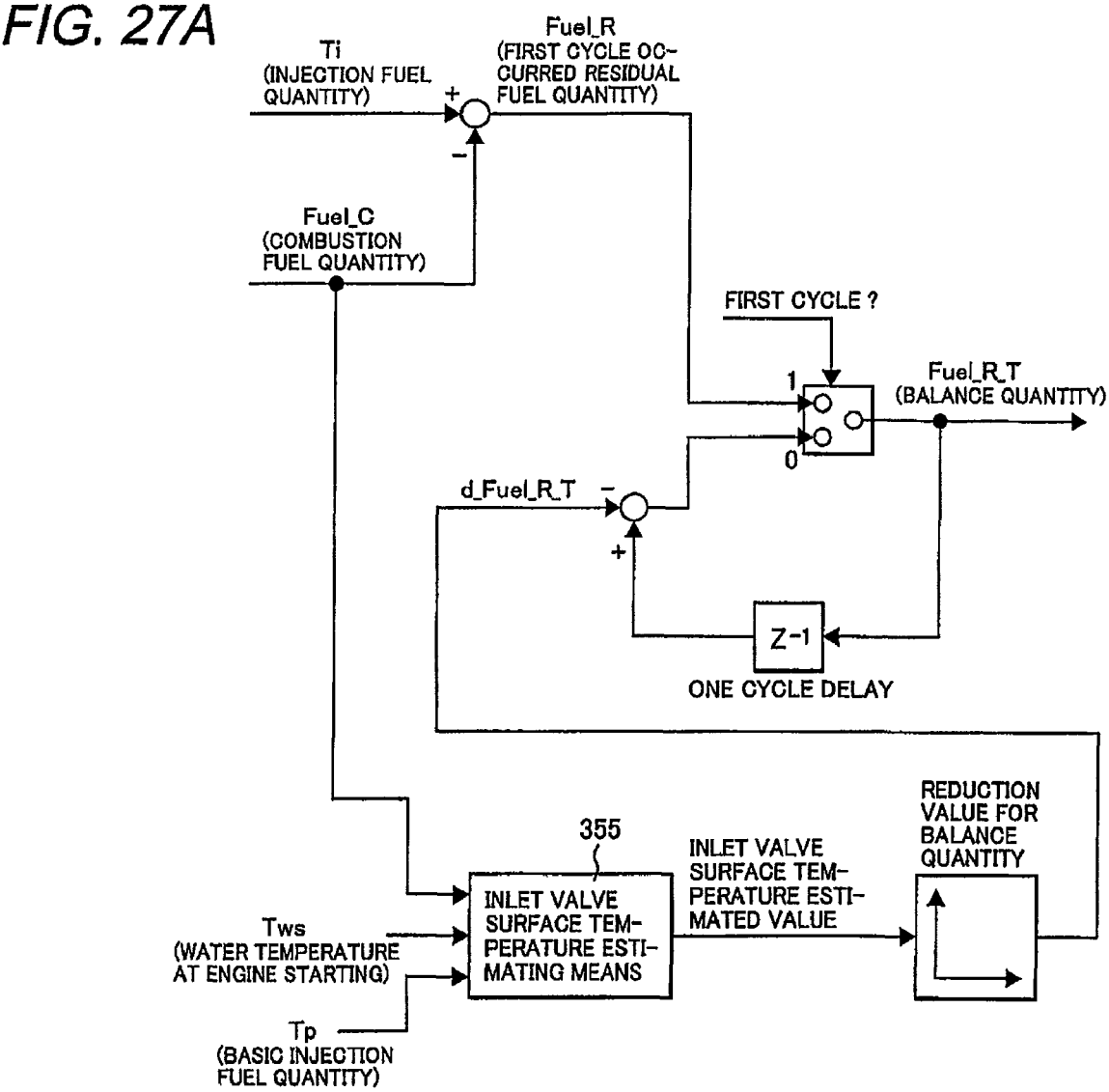
FIGS. 27A and 27B are views explaining the residual fuel quantity computing means of the third embodiment.
Figure 27B:
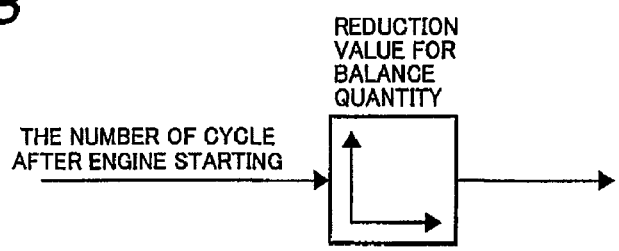
Figure 28:
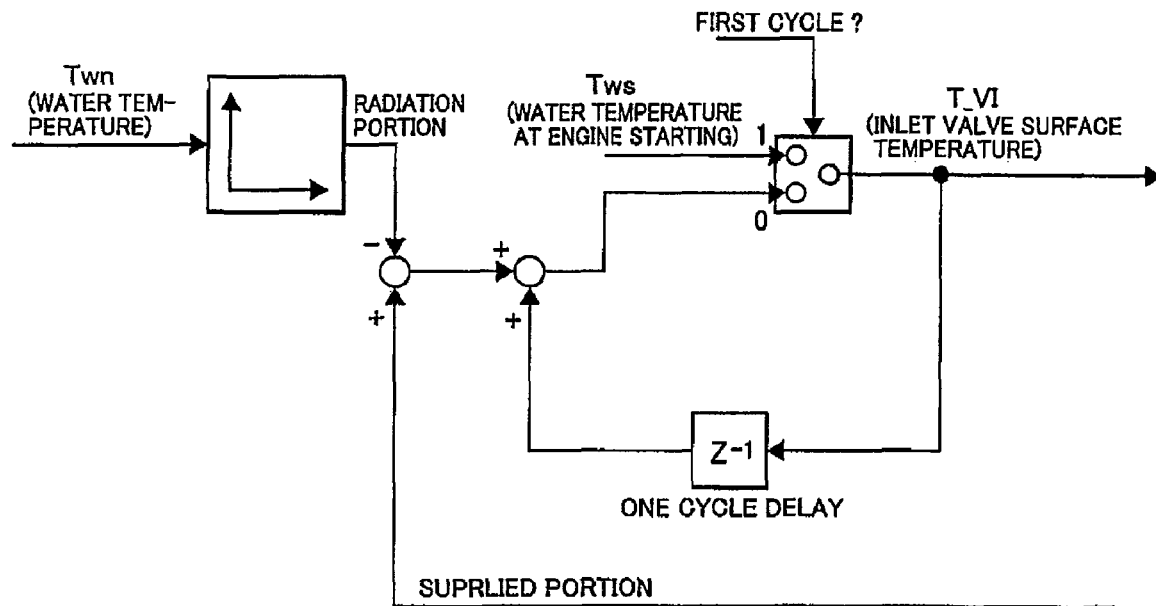
FIG. 28 is a view explaining the inlet valve surface temperature estimating means as shown in FIG. 27.
Figure 28:
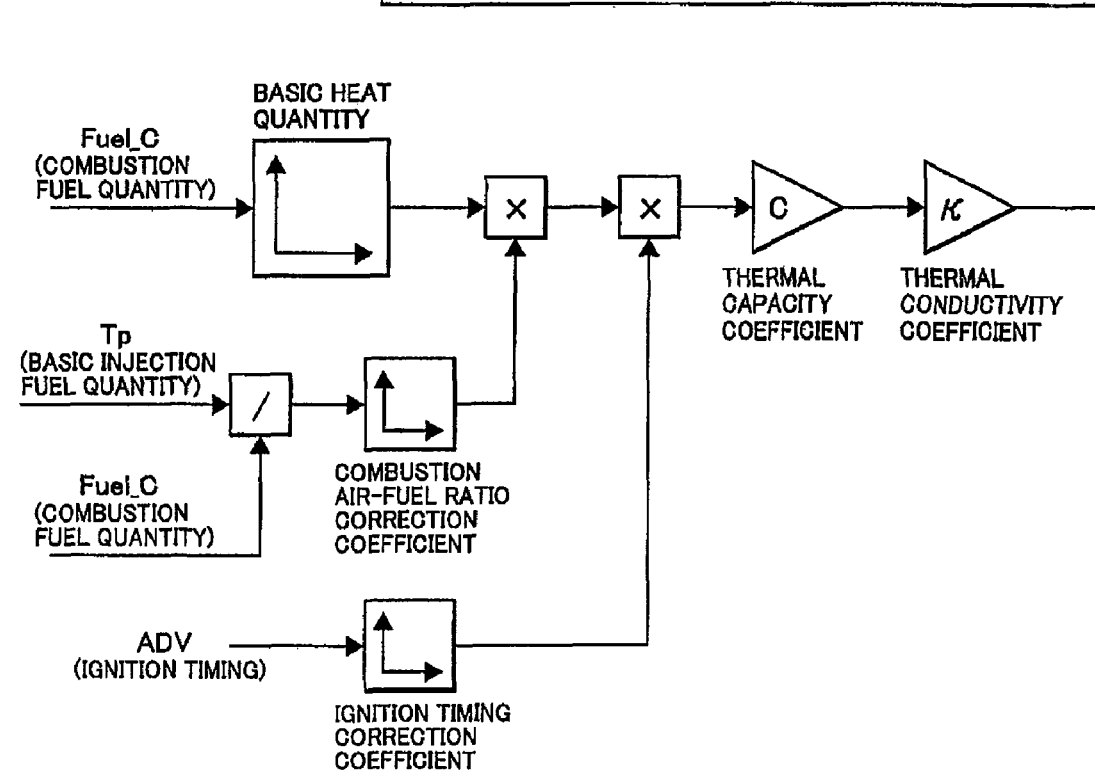

FIGS. 27 and 28

In the second embodiment as shown above, the residual fuel quantity for the next cycle and subsequent times is computed by using the combustion fuel quantity (angular acceleration). In contrast to this, in the third embodiment, the residual fuel quantity in the first cycle is obtained by using the combustion fuel quantity, and the residual fuel quantity for the second cycle and subsequent times is obtained by the surface temperature of the inlet valve 28.

The third embodiment differs from the first and second embodiments in only structure and function of the residual fuel quantity computing means (which is denoted by reference numeral 150 in the first embodiment, by reference numeral 250 in the second embodiment and by reference numeral 350 in the third embodiment), and they are the same except for that. Therefore, hereinafter, mainly explained is the residual fuel quantity computing means 350 and an inlet valve-surface temperature estimating means 355 included in this computing means 350).

<Residual Fuel Quantity Computing Means 350 (FIG. 27)>

The computing means 350 obtains the residual fuel quantity (Fuel_R) at the combustion occurrence in each cylinder (every cycle), respectively. The computation of the residual fuel quantity is carried out by computing means 350 for each cylinder. Concretely, as shown in FIG. 27(A), the residual fuel quantity (Fuel_R) is obtained from a difference between the injection fuel quantity (Ti) and the combustion fuel quantity (Fuel_C) only in the first cycle; and the resulting residual fuel injection quantity is set as a balance quantity (Fuel_R_T) of fuel flowing on the wall surface in the first cycle. For the second cycle and subsequent times, a reduction value (d_Fuel_R_T) for the balance quantity is subtracted from the balance quantity (Fuel_R_T) of fuel flowing on the wall surface (for example a wall surface of the intake air passage and inlet valve) for each cylinder every combustion occurrence cycle; and the subtracted balance quantity is set as an updated balance quantity (Fuel_R_T) of fuel flowing on the wall surface. Here, the reduction value (d_Fuel_R_T) for the balance quantity is obtained by referring to a map using the inlet valve-surface temperature as an argument, wherein the inlet valve-surface temperature is estimated by the inlet valve-surface temperature estimating means.

Incidentally, as shown in FIG. 27B, the reduction value (d_Fuel_R_T) for the balance quantity may be simply obtained in accordance with the number of combustion cycles after the first combustion occurrence.

<Inlet Valve-Surface Temperature Estimating Means 355 (FIG. 28)>

As shown in FIG. 28, in the inlet valve-surface temperature estimating means 355 obtains a basic heat quantity by referring to a map using the combustion fuel quantity (Fuel_C) as an argument. Multiplying the basic heat quantity by a combustion air-fuel ratio correction coefficient and ignition timing correction coefficient, and further by a heat capacity coefficient and thermal conductivity coefficient, the resulting value is set as a supplied heat quantity portion for the inlet valve-surface temperature. The combustion air-fuel ratio correction coefficient is obtained by referring to a map using a ratio of the basic injection fuel quantity (Tp) to the combustion fuel quantity (Ti), namely, using the air-fuel ratio as an argument. The ignition timing correction coefficient is obtained by referring to a map using the ignition timing (ADV) as an argument. On the other hand, a heat radiation quantity portion for the inlet valve-surface temperature is obtained by referring to a map using the temperature of the engine cooling water as an argument. An initial value of the inlet valve-surface temperature is obtained by referring to a map using the temperature of the engine cooling water at engine starting as an argument. Then, a heat balance computation of the supplied heat quantity portion and radiation quantity portion is carried out every combustion occurrence, and the resulting value is updated as the estimated value of the inlet valve-surface temperature. Incidentally, each map value may be obtained from the experiment.

The Fourth Embodiment

Figure 29:
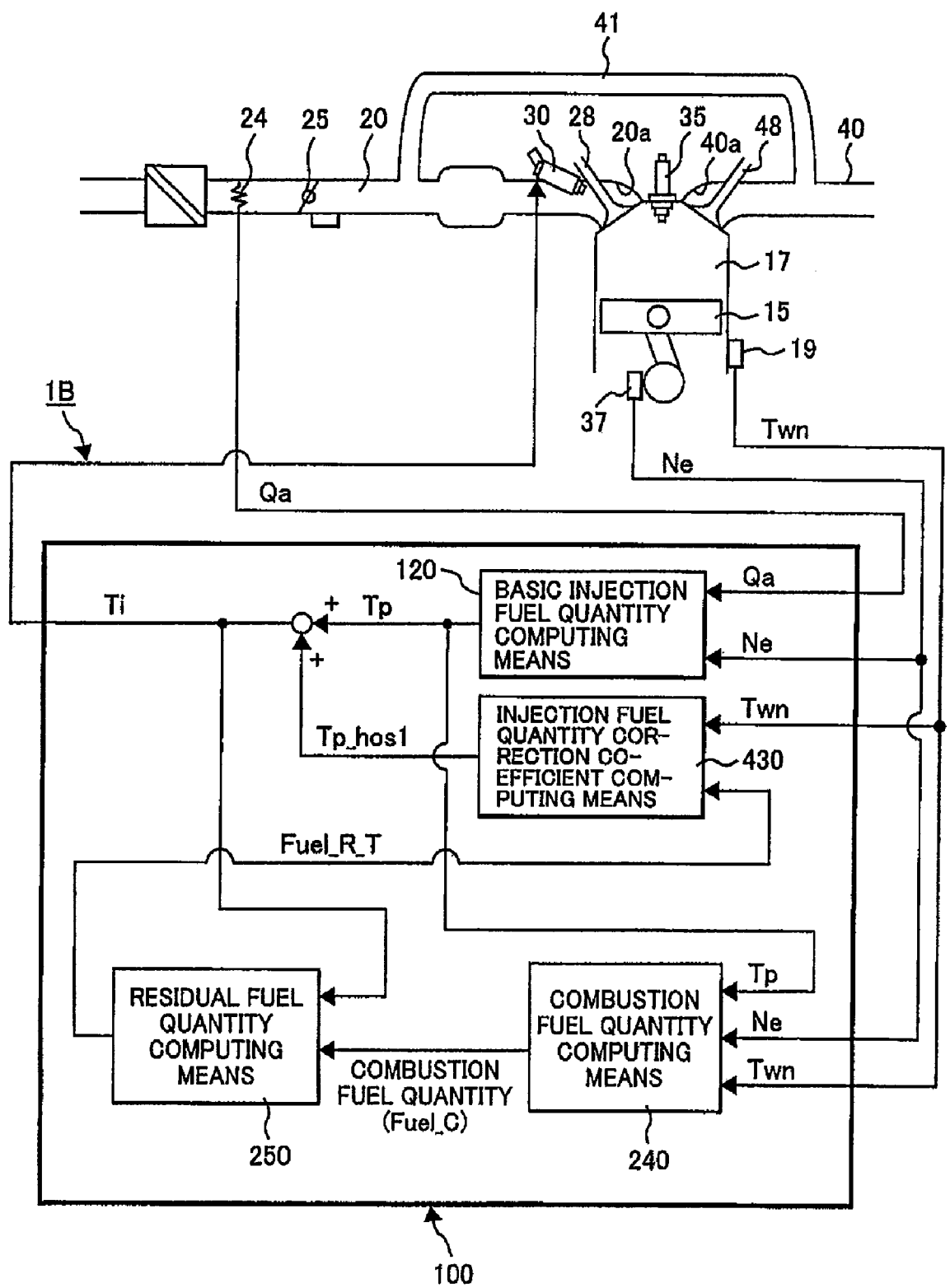
FIG. 29 is a view showing the control system of the forth embodiment.
Figure 30:
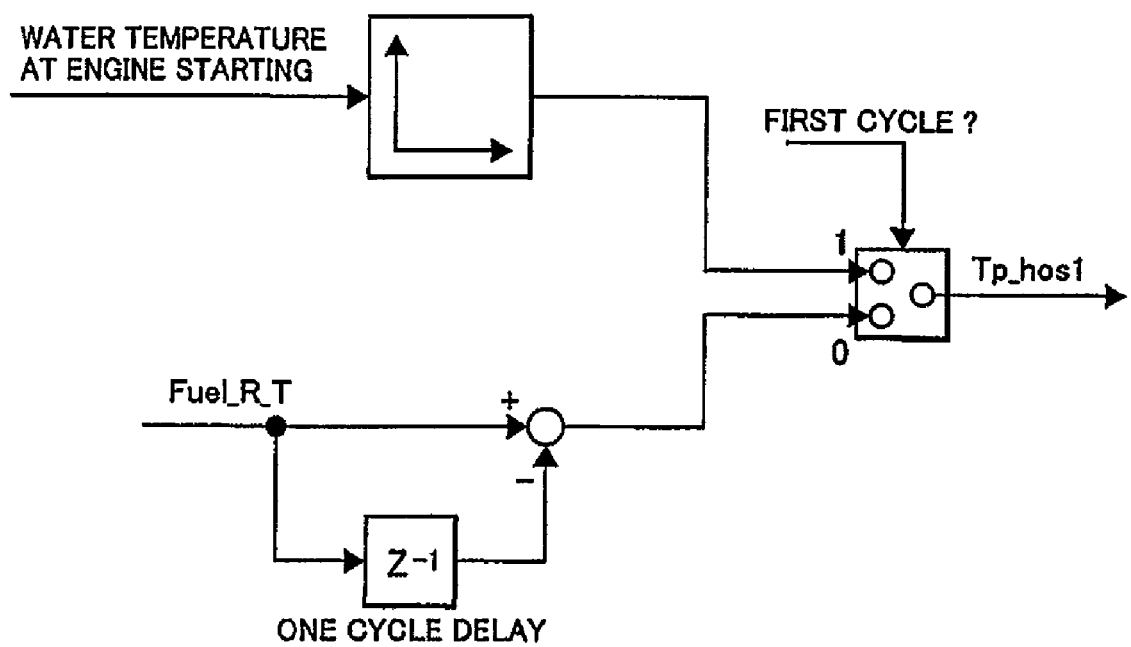
FIG. 30 is a view explaining the fuel injection quantity correction coefficient computing means of the fourth embodiment.

FIGS. 29 and 30

In the first to third embodiments described above, the residual fuel quantity (namely balance quantity of fuel flowing on the wall surface) is obtained. In the fourth embodiment, explained is a system for realizing an injection fuel quantity enabling to maintain the combustion fuel quantity (fuel quantity flowing into the combustion chamber) at a predetermined value by considering influence of the residual fuel quantity (balance quantity of fuel flowing on the wall surface).

FIG. 29 is a view showing the control system 1B of the fourth embodiment. A control unit 100 of the control system 1B, as shown in the function block diagram, has a basic injection fuel quantity computing means 120 with same structure and function as that of the first embodiment (FIG. 24), an injection fuel quantity-correction coefficient computing means 430 differing from the first to 3 embodiments in its structure and function, a combustion fuel quantity computing means 240 having the same structure as that of second embodiment (FIG. 25) and a residual fuel quantity computing means 250 having the same structure and function as that of the second embodiment (FIG. 26).

In this embodiment, a correction quantity (Tp_hos1) for injection fuel quantity, which is computed for each cylinder by injection fuel quantity-correction coefficient computing means 430, is added to the basic injection fuel quantity (Tp), and thereby the injection fuel quantity (Ti) is computed for each cylinder so as to maintain the combustion air-fuel ratio at a desired air-fuel ratio. The value of (Tp_hos1) obtained by the injection fuel-correction coefficient computing means 430 is set so as to maintain the combustion fuel quantity (quantity of fuel flowing into the combustion chamber) at a desired value, especially, in consideration to the influence of the residual fuel (fuel flowing on the wall) occurred at engine starting. In the residual fuel quantity computing means 250, the residual fuel quantity is obtained from the combustion fuel quantity and injection fuel quantity.

Next, the injection fuel quantity-correction coefficient computing means 430, which differs from the first to third embodiments in structure and function, is explained.

<Injection Fuel Quantity-Correction Coefficient Computing Means 430 (FIG. 30)>

The computing means 430 computes the correction quantity (namely fuel injection quantity-correction coefficient (Tp_hos1)) for injection fuel quantity. Particularly, in consideration to influence of the residual fuel (balance quantity of fuel flowing on the wall surface) occurred in engine starting, the combustion fuel quantity (fuel quantity flowing into the combustion chamber) is determined so as to be a desired value. Concretely, as shown in FIG. 30, an increasing correction value (fuel injection quantity-correction coefficient (Tp_hos1)) is computed in accordance with the engine cooling water temperature at engine starting in the first cycle. For the second cycle and subsequent times, a reduce correction quantity (injection fuel quantity-correction coefficient (Tp_hos1)) is computed by a difference between the residual fuel quantity of previous value and the current value of that. That is, the residual fuel quantity is largest in the first cycle and gradually decreases in the second cycle and subsequent times. Accordingly, the decreasing portion of the residual fuel quantity flows into the combustion camber and as a result, the air-fuel ratio becomes rich. In consideration to that, when correcting by reduction of the injection fuel quantity beforehand, the air-flow ratio in the combustion chamber can be remained to be optimum value.

Embodiment 5

FIG. 31

In the fourth embodiment described above, the system is explained that computes the residual fuel quantity for the second cycle and subsequent times by using the combustion fuel quantity (angular acceleration) and realizes the injection fuel quantity to maintain the combustion fuel quantity at a desired value in consideration to the influence of the residual fuel quantity. In the fifth embodiment, the residual fuel quantity of the first cycle is obtained from the combustion fuel quantity and a residual fuel quantity for the second cycle and subsequent times is obtained from the inlet valve-surface temperature.

Figure 31:
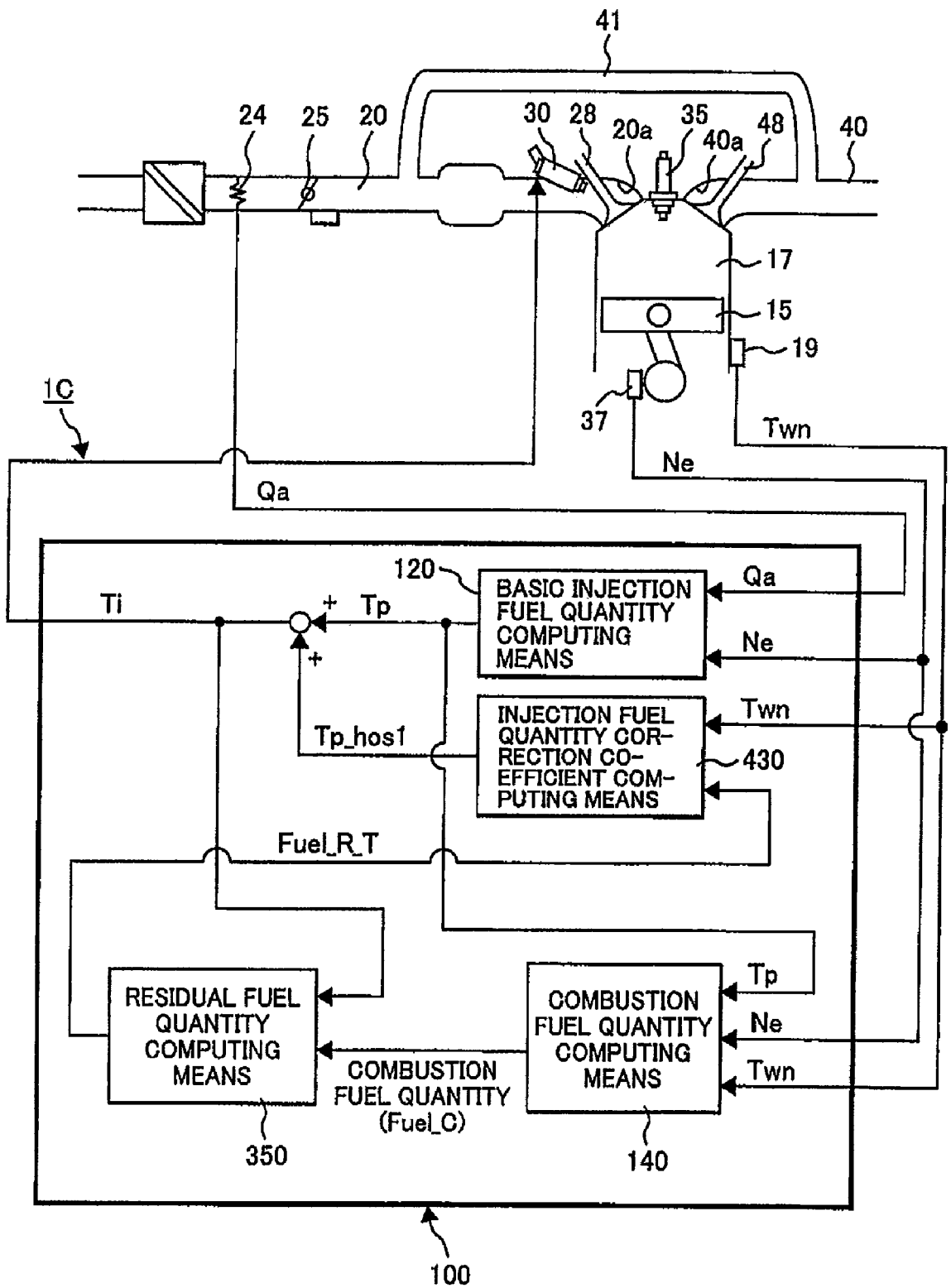
FIG. 31 is a view showing the control system of the fifth embodiment.

FIG. 31 is showing a control system IC of the fifth embodiment. A control unit 100 of the control system IC comprises a basic injection fuel quantity computing means 120 having the same structure and function as that of the first embodiment (FIG. 21) as shown in the function block diagram, a combustion fuel quantity-correction coefficient computing means 130 having the same structure and function as that of the fourth embodiment (FIG. 22), a combustion fuel quantity computing means 140 having the same structure and function as that of the first embodiment (FIG. 23), and a residual fuel quantity computing means 350 having the same structure and function as that of the third embodiment (FIG. 27).

As explanation on each of means 120, 430, 140 and 350 is already done, repeating of the explanation is omitted here.

As shown in the fifth embodiment, even when the residual fuel quantity of the first cycle is obtained from the combustion fuel quantity and the residual fuel quantity for the second cycle and subsequent times is obtained from the inlet valve surface temperature, the same action and effects as that of above described embodiment are established.

Additionally, the first to fifth embodiments described above assumes that occurring place of the residual fuel quantity exists in the intake passage 20 (inner wall surface of the inlet port 20a, the inlet valve 28 surface or the like), however, in the case the occurring place of the residual fuel quantity exists in cylinders (inner wall surface of the combustion chamber 17, surface of the piston 15 or the like) and crank case, the present invention is applicable.

As described above, the engine control system in accordance with the embodiments of the present invention consider the influence of adhered fuel flowing on the wall surface in the intake passage occurred at engine starting. It may be possible to control the combustion air-fuel ratio from engine starting with high accuracy and high robust, as a result, exhaust gas emission characteristic or the like at engine starting is improved.

What is claimed is:

1. An engine control system for an internal combustion engine with a fuel injector, comprising:
    a combustion fuel quantity determining means for determining a combustion fuel quantity in a combustion cycle at cold engine starting;
    a residual fuel quantity computing means for computing a residual fuel quantity in the combustion cycle based on a difference between an injection fuel quantity of the fuel injector and the combustion fuel quantity; and
    means for calculating or correcting an injection fuel quantity for the next combustion cycle and subsequent times based on the residual fuel quantity;
    wherein the combustion fuel quantity determining means determines the combustion fuel quantity in a first combustion cycle;
    wherein the residual fuel quantity computing means computes the residual fuel in the first cycle based on a difference between the injection fuel quantity and the combustion fuel quantity in the first cycle; and
    the engine control system further comprises an injection fuel quantity computing means for calculating or correcting an injection fuel for the second cycle and subsequent times based on the residual fuel quantity in the first combustion cycle.

2. An engine control system according to claim 1, wherein the injection fuel quantity computing means, the combustion fuel quantity determining means and the residual fuel quantity computing means respectively obtain the injection fuel quantity, the combustion fuel quantity and the residual fuel quantity for each cylinder.

3. An engine control system for an internal combustion engine with a fuel injector, comprising:
    a combustion fuel quantity determining means for determining a combustion fuel quantity in a combustion cycle at cold engine starting;
    a residual fuel quantity computing means for computing a residual fuel quantity in the combustion cycle based on a difference between an injection fuel quantity of the fuel injector and the combustion fuel quantity; and
    means for calculating or correcting an injection fuel quantity for the next combustion cycle and subsequent times based on the residual fuel quantity;
    wherein the combustion fuel quantity determining means determines the combustion fuel quantity based on at least one of a combustion pressure in a cylinder of the engine, an air-fuel ratio and a gas temperature in the cylinder sensed directly or indirectly.

4. An engine control system according to claim 3, wherein the combustion fuel quantity determining means computes the combustion fuel quantity based on a sensor signal of at least one of an in-cylinder gas temperature sensor and an exhaust gas temperature sensor.

5. An engine control system for an internal combustion engine with a fuel injector, comprising:
a combustion fuel quantity determining means for determining a combustion fuel quantity in a combustion cycle at cold engine starting;
a residual fuel quantity computing means for computing a residual fuel quantity in the combustion cycle based on a difference between an injection fuel quantity of the fuel injector and the combustion fuel quantity; and
means for calculating or correcting an injection fuel quantity for the next combustion cycle and subsequent times based on the residual fuel quantity;
wherein the combustion fuel quantity determining means computes the combustion fuel quantity based on a sensing signal from at least one of a pressure sensor in a cylinder of the engine, an engine speed sensor and an air-fuel ratio sensor.

6. An engine control system according to claim 5, wherein the combustion fuel quantity determining means computes the combustion fuel quantity based on at least an angular acceleration of the engine speed.

7. An engine control system for an internal combustion engine with a fuel injector, comprising:
a combustion fuel quantity determining means for determining a combustion fuel quantity in a combustion cycle at cold engine starting;
a residual fuel quantity computing means for computing a residual fuel quantity in the combustion cycle based on a difference between an injection fuel quantity of the fuel injector and the combustion fuel quantity;
means for calculating or correcting an injection fuel quantity for the next combustion cycle and subsequent times based on the residual fuel quantity;
an inflow fuel quantity computing means for computing a fuel quantity portion flowing into a combustion chamber of the engine or burning in the combustion chamber in the next combustion cycle in the residual fuel quantity; and
a next cycle-injection fuel quantity computing means for computing the fuel quantity to be injected in the next combustion cycle based on the fuel quantity portion computed by the inflow fuel quantity computing means.

8. An engine control system according to claim 7; wherein said next cycle-injection fuel quantity computing means computes the fuel quantity to be injected in the next combustion cycle so as to make air-fuel ratio in the next cycle equal to a predetermined air-fuel ratio.

9. An engine control system for an internal combustion engine with a fuel injector, comprising:
a combustion fuel quantity determining means for determining a combustion fuel quantity in a combustion cycle at cold engine starting;
a residual fuel quantity computing means for computing a residual fuel quantity in the combustion cycle based on a difference between an injection fuel quantity of the fuel injector and the combustion fuel quantity;
means for calculating or correcting an injection fuel quantity for the next combustion cycle and subsequent times based on the residual fuel quantity;

a next cycle-inflow rate computing means for computing a rate of a fuel quantity portion flowing into a combustion chamber of the engine in the next combustion cycle in the residual fuel quantity remaining in an intake passage of each cylinder;
a target next cycle-inflow fuel quantity computing means for computing a target inflow fuel quantity flowing into each cylinder in the next combustion cycle;
a target total fuel quantity computing means for computing a target total fuel quantity in the intake passage in the next combustion cycle of each cylinder based on the target next cycle-inflow fuel quantity and the next cycle-inflow rate of each cylinder; and
a next cycle-injection fuel quantity computing means for computing the fuel quantity to be injected in the next combustion cycle based on a difference between the target total fuel quantity in the intake passage and the residual fuel for each cylinder.

10. An engine control system according to claim 9, further comprising a sensor means for sensing at least one of the viscosity and temperature of the fuel,
wherein the next cycle-inflow rate computing means computes the rate of the fuel quantity portion flowing into the combustion chamber in the next combustion cycle based on the at least one of viscosity and temperature of the fuel.

11. An engine control system according to claim 9, further comprising a sensor means for sensing at least one of an inlet valve surface temperature and an inner wall surface temperature in the intake passage,
wherein the next cycle-inflow rate computing means computes the rate of the fuel quantity portion flowing into the combustion chamber in the next combustion cycle based on the at least one of inlet valve surface temperature and inner wall surface temperature in the intake passage.

12. An engine control system according to claim 11, wherein the sensor means comprises:
a means for computing a supplied heat quantity portion for at least one of the inlet valve surface temperature and an inner wall surface temperature in the intake passage;
a means for computing a radiation quantity portion for the at least one of inlet valve surface temperature and an inner wall surface temperature in the intake passage;
a means for computing at least one of initial temperature of the inlet valve surface temperature and the wall surface temperature in the intake passage; and
a means for updating an estimated value of at least one of the inlet valve surface temperature and wall surface temperature in the intake passage based on the initial temperature, supplied heat quantity portion and radiation heat part.

13. An engine control system according to claim 12, wherein the sensor means comprises:
a means for computing a basic heat quantity based on the combustion fuel quantity;
a means for computing an air-fuel ratio sensitivity correction quantity based on a combustion air-fuel ratio;
a means for computing an ignition timing sensitivity correction quantity based on the ignition timing;
a means for computing a heat capacity and heat conductivity coefficient;
a means for computing a supplied heat quantity portion based on the basic heat quantity, combustion air-fuel sensitivity correction quantity, ignition timing sensitivity correction quantity, heat capacity and heat conductivity coefficient;
a means for computing radiation heat; and a means for setting at least one of the inlet valve surface temperature and the inner wall surface temperature of the intake passage as an initial value.

14. An engine control system for an internal combustion engine with a fuel injector, comprising:
- a combustion fuel quantity determining means for determining a combustion fuel quantity in a combustion cycle at cold engine starting;
- a residual fuel quantity computing means for computing a residual fuel quantity in the combustion cycle based on a difference between an injection fuel quantity of the fuel injector and the combustion fuel quantity; and
- means for calculating or correcting an injection fuel quantity for the next combustion cycle and subsequent times based on the residual fuel quantity;
- wherein the residual fuel quantity computing means treats the residual fuel quantity for each cylinder in the current combustion cycle as a balance quantity of fuel flowing on a wall surface for each cylinder from the current combustion cycle until a predetermined cycle.

15. An engine control system according to claim 14, further comprising a balance quantity computing means for computing the balance quantity of fuel flowing on a wall surface for each cylinder until the predetermined cycle based on the residual fuel quantity for each cylinder in the first combustion cycle.

16. An engine control system according to claim 15, further comprising:
- a sensor means for sensing at least one of an inlet valve surface temperature and an inner wall surface temperature in an intake passage of the engine; and
- a computing means for computing a reduction value for the balance quantity based on the at least one of inlet valve surface temperature and inner wall surface temperature in the intake passage;
- wherein the balance quantity computing means updates the balance quantity of flow flowing on the wall surface for each cylinder until a predetermined cycle, by subtracting the residual fuel quantity for each cylinder in the first combustion cycle by the reduction value for the balance quantity.

17. An engine control system according to claim 16,
- wherein the balance quantity computing means updates the balance quantity of flow flowing on the wall surface for each cylinder until a predetermined cycle, by subtracting the residual fuel quantity for each cylinder in the first combustion cycle by the reduction value increased in accordance with the number of the combustion cycles.

* * * * *